(12) United States Patent
Kato et al.

(10) Patent No.: US 8,982,675 B2
(45) Date of Patent: Mar. 17, 2015

(54) POWER SUPPLY UNIT AND ELECTRONIC TIMEPIECE

(75) Inventors: Kazuo Kato, Chiba (JP); Akira Takakura, Chiba (JP); Toshitaka Fukushima, Chiba (JP); Keisuke Tsubata, Chiba (JP); Hisao Nakamura, Chiba (JP); Tomohiro Ihashi, Chiba (JP); Yoshinori Sugai, Chiba (JP); Eriko Noguchi, Chiba (JP); Satoshi Sakai, Chiba (JP); Takanori Hasegawa, Chiba (JP)

(73) Assignee: Seiko Instruments Inc. (JP)

( * ) Notice: Subject to any disclaimer, the term of this patent is extended or adjusted under 35 U.S.C. 154(b) by 647 days.

(21) Appl. No.: 13/199,499

(22) Filed: Aug. 31, 2011

(65) Prior Publication Data
US 2012/0057437 A1 Mar. 8, 2012

(30) Foreign Application Priority Data

Sep. 2, 2010 (JP) .................................. 2010-197009
Jul. 1, 2011 (JP) .................................. 2011-147386

(51) Int. Cl.
| | | |
|---|---|---|
| G04C 23/00 | (2006.01) | |
| G04C 17/00 | (2006.01) | |
| G05F 1/00 | (2006.01) | |
| G06F 3/038 | (2013.01) | |
| H02J 1/10 | (2006.01) | |
| G04C 10/02 | (2006.01) | |
| G04G 19/06 | (2006.01) | |
| H02J 7/00 | (2006.01) | |
| H02J 7/34 | (2006.01) | |

(52) U.S. Cl.
CPC ................ *G04C 10/02* (2013.01); *G04G 19/06* (2013.01); *H02J 1/102* (2013.01); *H02J 7/00* (2013.01); *H02J 7/345* (2013.01)
USPC ............... 368/66; 268/84; 268/242; 323/271; 323/284; 345/211

(58) Field of Classification Search
USPC ................. 368/64, 66, 82–84, 204, 239, 242; 323/271, 282, 284; 345/211, 212
See application file for complete search history.

(56) References Cited

U.S. PATENT DOCUMENTS

| | | | | |
|---|---|---|---|---|
| 4,634,953 | A | * | 1/1987 | Shoji et al. ..................... 368/205 |
| 5,886,953 | A | * | 3/1999 | Kawahara et al. .............. 368/66 |
| 6,815,935 | B2 | * | 11/2004 | Fujii ............................. 323/272 |

(Continued)

FOREIGN PATENT DOCUMENTS

| | | |
|---|---|---|
| JP | 57076615 | 5/1982 |
| JP | 06327236 | 11/1994 |

*Primary Examiner* — Vit W Miska
(74) *Attorney, Agent, or Firm* — Adams & Wilks

(57) ABSTRACT

A power supply unit has a first power supply circuit that supplies a voltage to a load driving unit and a second power supply circuit that supplies a voltage to circuits other than the load driving unit. A first switching unit connects any one of a power supply that supplies a power supply voltage and a voltage step-down circuit that supplies a step-down voltage of the power supply voltage to the first power supply circuit. A second switching unit connects any one of the power supply and the voltage step-down circuit to the second power supply circuit. A control unit controls the connection by the first switching unit and the connection by the second switching unit to switch the voltage supplied to the first power supply circuit and the voltage supplied to the second power supply circuit in accordance with properties of the load driving unit.

19 Claims, 13 Drawing Sheets

(56) References Cited

U.S. PATENT DOCUMENTS

| | | | |
|---|---|---|---|
| 6,873,322 B2* | 3/2005 | Hartular | 345/212 |
| 7,248,030 B2* | 7/2007 | Yoshino | 323/284 |
| 7,759,916 B2* | 7/2010 | Kleveland | 323/268 |
| 7,802,122 B2* | 9/2010 | Park | 713/340 |
| 2002/0036635 A1* | 3/2002 | Shimamoto | 345/211 |
| 2004/0174148 A1* | 9/2004 | Hiraki et al. | 323/268 |
| 2006/0284864 A1* | 12/2006 | Woo | 345/211 |
| 2009/0077393 A1* | 3/2009 | Nakamura | 713/310 |

* cited by examiner

FIG. 4

| TYPE OF LCD | CPU CLOCK FREQUENCY | OSCILLATOR CIRCUIT POWER SUPPLY | LOGIC CIRCUIT POWER SUPPLY | LCD DRIVER CIRCUIT POWER SUPPLY |
|---|---|---|---|---|
| TN LIQUID CRYSTAL | 32 kHz | HALVER CIRCUIT OUTPUT | HALVER CIRCUIT OUTPUT | HALVER CIRCUIT OUTPUT |
| STN LIQUID CRYSTAL | 32 kHz | HALVER CIRCUIT OUTPUT | HALVER CIRCUIT OUTPUT | HALVER CIRCUIT OUTPUT |
| PN LIQUID CRYSTAL | 32 kHz | HALVER CIRCUIT OUTPUT | HALVER CIRCUIT OUTPUT | BATTERY OUTPUT |
| TN/STN/PN | CR 500 kHz | BATTERY OUTPUT | BATTERY OUTPUT | BATTERY OUTPUT |

FIG. 9

| BATTERY VOLTAGE | OSCILLATOR CIRCUIT POWER SUPPLY | LOGIC CIRCUIT POWER SUPPLY | LCD DRIVER CIRCUIT POWER SUPPLY | OSCILLATOR CIRCUIT | LOGIC UNIT | DISPLAY OF TN LIQUID CRYSTAL |
|---|---|---|---|---|---|---|
| 2.4V-3.0V | HALVER CIRCUIT OUTPUT | HALVER CIRCUIT OUTPUT | HALVER CIRCUIT OUTPUT | OPERATE | OPERATE | CLOCK DISPLAY |
| 2.0V-2.4V | HALVER CIRCUIT OUTPUT | HALVER CIRCUIT OUTPUT | BATTERY OUTPUT | OPERATE | OPERATE | CLOCK DISPLAY |
| 1.7V-2.0V | BATTERY OUTPUT | BATTERY OUTPUT | BATTERY OUTPUT | OPERATE | OPERATE | CHARGE WARNING DISPLAY |
| 1.0V-1.7V | BATTERY OUTPUT | BATTERY OUTPUT | BATTERY OUTPUT | OPERATE | OPERATE | TURN OFF (NON-DRIVEN STATE) |
| 1.0V OR LESS | BATTERY OUTPUT | BATTERY OUTPUT | BATTERY OUTPUT | STOP | STOP | TURN OFF (NON-DRIVEN STATE) |

FIG. 11

| HEAVY-LOAD OPERATION | BATTERY VOLTAGE | OSCILLATOR CIRCUIT POWER SUPPLY | LOGIC CIRCUIT POWER SUPPLY | LCD DRIVER CIRCUIT POWER SUPPLY |
|---|---|---|---|---|
| BEFORE DRIVING | 2.4V-3.0V | HALVER CIRCUIT OUTPUT | HALVER CIRCUIT OUTPUT | HALVER CIRCUIT OUTPUT |
| IMMEDIATELY BEFORE AND AFTER DRIVING | 1.3V-2.4V | BATTERY OUTPUT | BATTERY OUTPUT | BATTERY OUTPUT |
| AFTER DRIVING | 2.4V-3.0V | HALVER CIRCUIT OUTPUT | HALVER CIRCUIT OUTPUT | HALVER CIRCUIT OUTPUT |

POWER SUPPLY UNIT AND ELECTRONIC TIMEPIECE

BACKGROUND OF THE INVENTION

1. Field of the Invention

The present invention relates to a power supply unit and an electronic timepiece.

2. Background Art

Many small electronic devices often use batteries as a power supply, and thus, power saving is important. In such a small electronic device, the voltage of a battery is divided or stepped down so that appropriate voltages are supplied to the respective circuits. FIG. 12 is a block diagram of a power supply unit 900 of an electronic device having a TN (Twisted Nematic) liquid crystal. In FIG. 12, a TN liquid crystal 921 is a load. A battery 901 is a button cell, for example, of which the initial voltage is 3 V.

The voltage step-down circuit 902 which is a halver circuit steps down the voltage of the battery 901 to generate 1.2 V and supplies the generated voltage to an oscillator power supply circuit 903 and a LCD driver power supply circuit 905. The oscillator power supply circuit 903 supplies 0.9 V to an oscillator circuit 904 using the voltage of 1.2 V supplied from the voltage step-down circuit 902. Thus, the oscillator power supply circuit 903 consumes power corresponding to a voltage difference $\Delta V=0.3$ V ($0.3=1.2-0.9$) between the input and the output.

The oscillator circuit 904 generates a clock signal used in a small device.

The LCD driver power supply circuit 905 which is connected to capacitors 907 to 909 steps up the input voltage of 1.2 V using the capacitors 907 to 909 to generate a voltage $V_{L1}=1.2$ V which is 1 times the voltage of 1.2 V, a voltage $V_{L2}=2.4$ V which is 2 times the voltage $V_{L1}$, and a voltage $V_{L3}=3.6$ V which is 3 times the voltage $V_{L1}$. The LCD driver power supply circuit 905 supplies the generated voltages $V_{L1}=1.2$ V, $V_{L2}=2.4$ V, and $V_{L3}=3.6$ V to an LCD driver circuit 906.

The LCD driver circuit 906 drives the TN liquid crystal 921 using the supplied voltages $V_{L1}=1.2$ V, $V_{L2}=2.4$ V, and $V_{L3}=3.6$ V.

That is, when the TN liquid crystal 921 is a load, a voltage stepped down by the voltage step-down circuit 902 is supplied to the oscillator power supply circuit 903 and the LCD driver power supply circuit 905. Moreover, since the voltage step-down circuit 902 steps down the battery voltage to 1.2 V, for example, the voltage of the battery 901 can be used in the range of from 3 V (initial state) to 2.4 V.

FIG. 13 is a block diagram of a power supply unit 910 of an electronic device having a PN (Polymer Network) liquid crystal. In FIG. 13, a PN liquid crystal 922 is a load.

A battery 901 is a button cell, for example, of which the initial voltage is 3 V.

An oscillator power supply circuit 903 supplies a voltage of 0.9 V to an oscillator circuit 904 using the voltage ranging from 3 V to 2 V supplied from the battery 901.

The oscillator circuit 904 generates a clock signal used in a small device. Thus, the oscillator power supply circuit 903 consumes power corresponding to a voltage difference $\Delta V=2.1$ V ($2.1=3-0.9$) to 1.1 V ($1.1=2-0.9$) between the input and the output.

An LCD driver power supply circuit 915 generates a voltage $V_{L1}=1.5$ V using the input voltage ranging from 3V to 2V. The LCD driver power supply circuit 915 which is connected to capacitors 917 to 919 steps up the voltage $V_{L1}=1.5$ V using the capacitors 917 to 919 to generate a voltage $V_{L2}=3.0$ V which is 2 times the voltage $V_{L1}$, and a voltage $V_{L3}=4.5$ V which is 3 times the voltage $V_{L1}$. The LCD driver power supply circuit 915 supplies the generated voltages $V_{L1}=1.5$ V, $V_{L2}=3.0$ V, and $V_{L3}=4.5$ V to an LCD driver circuit 916.

The LCD driver circuit 916 drives the PN liquid crystal 922 using the voltages $V_{L1}=1.5$ V, $V_{L2}=3.0$ V, and $V_{L3}=4.5$ V supplied from the LCD driver power supply circuit 915.

That is, when the PN liquid crystal 922 is a load, the maximum required driving voltage (for example, 4.5 V) is higher than that of the TN liquid crystal 921. Thus, when the PN liquid crystal 922 is a load, the voltage of the battery 901 is directly supplied to the oscillator power supply circuit 903 and the LCD driver power supply circuit 915. Moreover, since the LCD driver power supply circuit 915 steps down the battery voltage to 1.5 V, for example, the voltage of the battery 901 can be used in the range of from 3 V (initial state) to 2 V.

In a power supply unit of such a small electronic device, according to the related art disclosed in JP-A-6-327236, stepping up of voltage is realized by charging and discharging capacitors at a predetermined timing.

Moreover, in such a power supply unit, according to the related art disclosed in JP-A-57-76615, depending on a load state of a liquid crystal display unit, voltage is supplied from a battery to a constant voltage circuit under a heavy load state, whereas voltage is supplied from a voltage step-down circuit to the constant voltage circuit under a load state other than the heavy load state. In this way, when the liquid crystal display unit is under the heavy load state so that the output voltage of the battery decreases, the output of the constant voltage circuit is supplied to a logic unit.

However, in the related art, when the voltage step-down circuit shown in FIG. 12 is used, if the battery voltage decreases to 2.4 V, the stepped-down voltage will become 1.2 V which is ½ of the battery voltage. In this case, since the LCD driver power supply circuit 905 steps up the voltage of 1.2 V by 3 times to generate the voltage of 3.6 V, it is possible to drive the TN liquid crystal. However, in this case, the LCD driver power supply circuit 905 cannot drive the PN liquid crystal of which the maximum driving voltage is 4.5 V. Thus, in order to drive the liquid crystal, it is necessary to select and use any one of the power supply units shown in FIGS. 12 and 13 depending on the maximum driving voltage. If the power supply unit of FIG. 13 is selected, there is a problem in that the power consumed by the oscillator power supply circuit 903 is greater than the configuration of FIG. 12.

Moreover, in the related art disclosed in JP-A-6-327236, there is a problem in that capacitors for decreasing the power consumed by a voltage step-up circuit and a circuit for controlling the charging/discharging timings are required.

Moreover, in the related art disclosed in JP-A-57-76615, the voltage supplied to the liquid crystal display unit is changed depending on the load state of the liquid crystal display unit. Thus, when the PN liquid crystal which requires a high driving voltage is a load, if the battery voltage decreases, it is not possible to generate the maximum driving voltage required for driving. As a result, there is a problem in that when the PN liquid crystal is the load, stepping-up of voltage based on the voltage stepped down by the voltage step-down circuit is not performed, so that power consumption is not decreased.

SUMMARY OF THE INVENTION

It is an aspect of the present application to provide a power supply unit and an electronic timepiece capable of decreasing power consumption.

According to the aspect of the application, there is provided a power supply unit including: a first power supply circuit that supplies a voltage to a load driving unit that drives a load unit; a second power supply circuit that supplies a voltage to circuits other than the load driving unit; and a control unit that switches the voltage supplied to the first power supply circuit and the voltage supplied to the second power supply circuit in accordance with properties of the load driving unit.

With this configuration, it is possible to switch the voltages supplied to the first and second power supply circuits in accordance with the load connected to the power supply unit and to decrease the power consumption of the respective power supply circuits.

In the power supply unit of the above aspect, the power supply unit may further include: a first switching unit that connects any one of a power supply that supplies a power supply voltage and a voltage step-down circuit that supplies a step-down voltage of the power supply voltage to the first power supply circuit; and a second switching unit that connects any one of the power supply that supplies the power supply voltage and the voltage step-down circuit that supplies the step-down voltage of the power supply voltage to the second power supply circuit, in which the control unit controls the connection of the first switching unit and the connection of the second switching unit, and the first switching unit and the second switching unit are disposed in parallel.

With this configuration, since the voltages supplied to the first and second power supply circuits are switched to the power supply voltage or the step-down voltage of the power supply voltage in accordance with the load connected to the power supply unit, it is possible to decrease the power consumption of the respective power supply circuits.

In the power supply unit of the above aspect, the power supply unit may further include a battery voltage detection unit that detects the power supply voltage, and the control unit performs switching based on the detected power supply voltage.

With this configuration, since a change in the power supply voltage is detected, and the voltages supplied to the first and second power supply circuits are switched to the power supply voltage of the step-down voltage of the power supply voltage based on the detected power supply voltage, it is possible to extend the driving time of the load unit.

In the power supply unit of the above aspect, when the detected power supply voltage is lower than a voltage determined based on a voltage necessary for driving the load unit using the step-down voltage supplied from the voltage step-down circuit, the control unit may connect the first switching unit to the power supply.

With this configuration, since the first switching unit is connected to the power supply when the detected voltage is lower than the lower-limit voltage necessary for driving the load unit, it is possible to maintain the driving of the load unit.

In the power supply unit of the above aspect, when the detected power supply voltage is lower than a voltage determined based on a voltage necessary for driving circuits other than the load driving unit using the step-down voltage supplied from the voltage step-down circuit, the control unit may connect the second switching unit to the power supply.

With this configuration, since the second switching unit is connected to the power supply when the detected voltage is lower than the lower-limit voltage necessary for driving circuits other than the load driving unit, it is possible to maintain the driving of circuits other than the load driving unit.

In the power supply unit of the above aspect, when the detected power supply voltage is not less than a voltage determined based on a voltage necessary for driving the load unit using the power supply voltage supplied from the power supply, the control unit may drive the load unit.

With this configuration, since the voltage capable of restarting the driving of the load unit is lower than that of a power supply unit of the related art, it is possible to shorten the time consumed from the start of charging to the restart of the driving of the load unit more so than the power supply unit of the related art.

In the power supply unit of the above aspect, the control unit may connect the first switching unit to the power supply immediately before the load unit starts a predetermined heavy-load operation.

With this configuration, since the first switching unit is connected to the power supply unit immediately before the load unit starts a predetermined heavy-load operation, it is possible to perform the heavy-load operation.

In the power supply unit of the above aspect, after the load unit performs a predetermined heavy-load operation, when the power supply voltage is not less than a voltage determined based on a voltage necessary for driving the load unit using the step-down voltage supplied from the voltage step-down circuit, the control unit may connect the first switching unit to the voltage step-down circuit.

With this configuration, since the first switching unit is connected to the voltage step-down circuit when the detected voltage is higher than the lower-limit voltage necessary for driving the load unit after the load unit performs a predetermined heavy-load operation, it is possible to reduce the power consumption of the first power supply circuit when the power supply voltage is restored.

In the power supply unit of the above aspect, the power supply unit may further include a plurality of internal clocks, and the control unit may switch the plurality of internal clocks after switching the voltage to the first power supply circuit in accordance with the properties or operation of the load driving unit.

With this configuration, since the internal clock is switched as well as the voltage supplied to the control unit in accordance with the properties or operation of the load connected to the power supply unit, it is possible to supply an appropriate voltage to the power supply circuit in accordance with the operation state of the control unit and to reduce the power consumption of the respective power supply circuits.

In the power supply unit of the above aspect, when a clock faster than the slowest clock of the plurality of internal clocks is used, the control unit may not switch the voltage supplied to the first power supply circuit and the voltage supplied to the second power supply circuit in accordance with the properties or operation of the load driving unit to which the power supply circuit supplies a voltage.

With this configuration, it is possible to prevent operation errors due to a change in voltage occurring when the voltages supplied to the first and second power supply circuits are changed when the control unit operates at a high-speed clock.

In the power supply unit of the above aspect, the load unit may be a liquid crystal display device, the first power supply circuit may be an LCD driving power supply circuit that supplies a voltage to an LCD driving unit that drives the liquid crystal display device, and the second power supply circuit may be a logic power supply circuit that supplies a voltage to a logic unit that includes the control unit.

With this configuration, when the liquid crystal display device is connected to the power supply unit, the control unit switches the voltage supplied to the LCD driving power supply circuit which is the first power supply circuit and the voltage supplied to the logic power supply circuit which is the second power supply circuit in accordance with the type or the like of the liquid crystal display unit which is the load. Thus, in a power supply unit in which the liquid crystal display unit is a load, it is possible to reduce the power consumption of the respective power supply circuits.

In the power supply unit of the above aspect, the load unit may be a sensor, the first power supply circuit may be a sensor driving power supply circuit that supplies a voltage to a sensor driving unit that drives the sensor, and the second power supply circuit may be a logic power supply circuit that supplies a voltage to a logic unit that includes the control unit.

With this configuration, when the sensor is connected to the power supply unit, the control unit switches the voltage supplied to the sensor driving power supply circuit which is the first power supply circuit and the voltage supplied to the logic power supply circuit which is the second power supply circuit in accordance with the operation state or the like of the sensor which is the load. Thus, in a power supply unit in which the sensor is a load, it is possible to reduce the power consumption of the respective power supply circuits.

According to another aspect of the application, there is provided an electronic timepiece including the power supply unit of the above aspect.

With this configuration, in an electronic timepiece including a power supply unit in which a liquid crystal display unit or a sensor is a load, it is possible to switch the voltages supplied to the first and second power supply circuits in accordance with the load connected to the power supply unit of the electronic timepiece and to reduce the power consumption of the respective power supply circuits.

According to the above aspects of the application, it is possible to provide a power supply unit and an electronic timepiece capable of decreasing power consumption.

BRIEF DESCRIPTION OF THE DRAWINGS

FIG. 4 is a diagram illustrating an example of the settings and the power supplies of the respective circuit units, used depending on the liquid crystal display device connected in the second embodiment.

FIG. 9 is a diagram showing the power supplies of the respective power supply circuits and the settings, used depending on the battery voltage of a secondary battery in the fourth embodiment.

FIG. 11 is a diagram showing an example of the power supplies of the respective power supply circuits and the setting, used depending on the battery voltage of a secondary battery in the fifth embodiment.

DETAILED DESCRIPTION OF THE INVENTION

Hereinafter, embodiments of the invention will be described in detail with reference to the drawings. The invention is not limited to the embodiments but various changes can be made within the range of the technical scope.

First Embodiment

Figure 1:
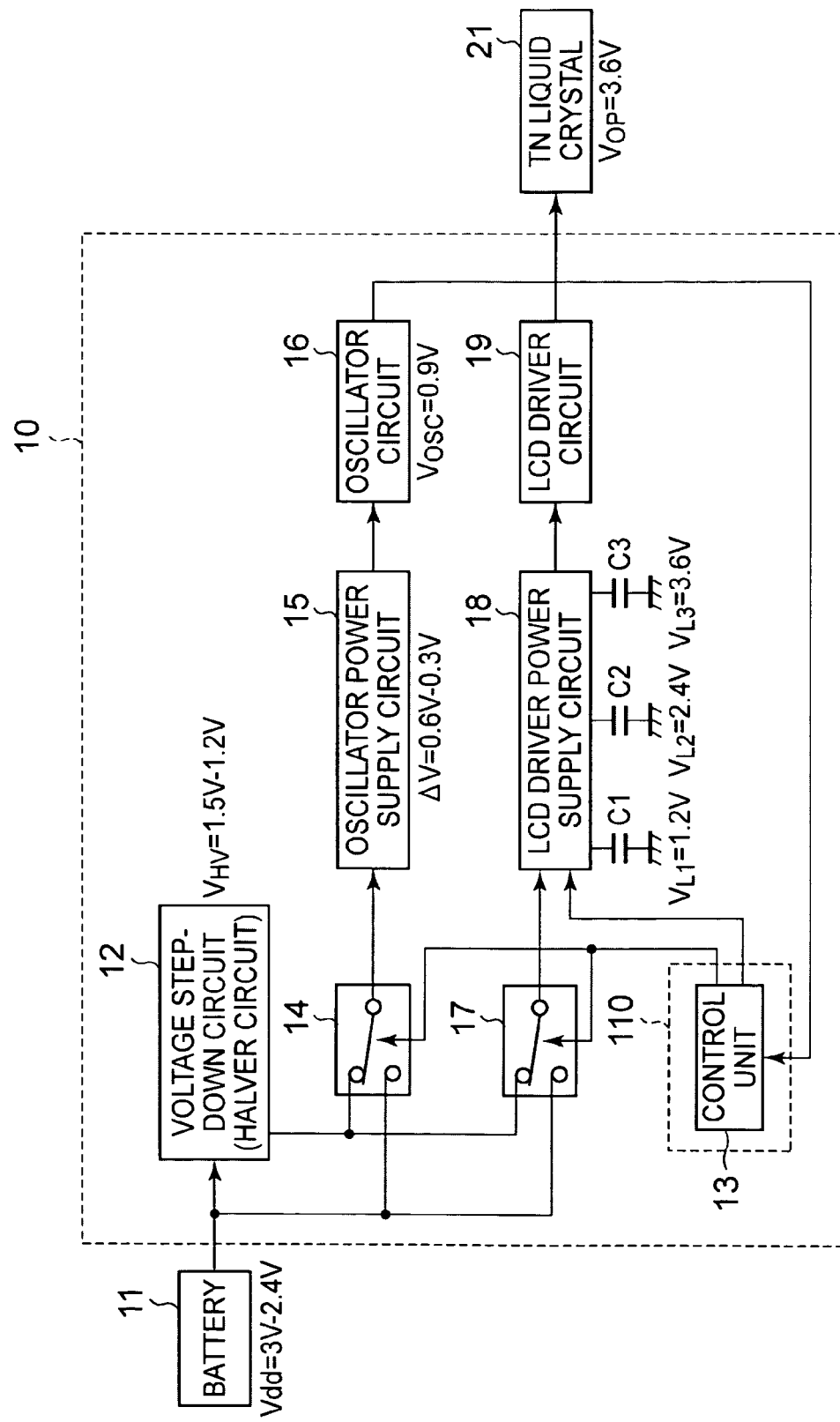
FIG. 1 is a block diagram of a power supply unit according to a first embodiment, to which a TN liquid crystal is connected.

FIG. 1 is a block diagram of a power supply unit 10 according to the present embodiment, to which a TN (Twisted Nematic) liquid crystal is connected. As shown in FIG. 1, the power supply circuit 10 according to the present embodiment includes a voltage step-down circuit 12, a logic unit 110, switching units 14 and 17, an oscillator power supply circuit (second power supply circuit) 15, an oscillator circuit 16, a LCD driver power supply circuit (first power supply circuit) 18, and a LCD driver circuit 19.

In FIG. 1, a TN liquid crystal 21 is a load. A battery (power supply voltage) 11 is a button cell, for example, of which the initial voltage is 3 V.

The voltage step-down circuit 12 which is a halver circuit steps down the output voltage of the battery 11 to generate a voltage ranging from 1.5 V to 1.2 V and supplies the generated voltage to the switching units 14 and 17. Since the voltage step-down circuit 12 secures the voltage of 1.2 V used by the LCD driver power supply circuit 18, for example, the output voltage of the battery 11 can be used in the range of from 3 V (initial state) to 2.4 V.

The switching unit 14 has one input connected to the output of the voltage step-down circuit 12, the other input connected to the output of the battery 11, and the output connected to the input of the oscillator power supply circuit 15. Moreover, the switching unit 14 selects any one of the output of the voltage step-down circuit 12 and the output of the battery 11 in accordance with a switching signal of a control unit 13 and outputs the selected output to the oscillator power supply circuit 15.

The switching unit 17 has one input connected to the output of the voltage step-down circuit 12, the other input connected to the output of the battery 11, and the output connected to the input of the LCD driver power supply circuit 18. Moreover, the switching unit 17 selects any one of the output of the voltage step-down circuit 12 and the output of the battery 11 in accordance with the switching signal of the control unit 13 and outputs the selected output to the LCD driver power supply circuit 18.

The logic unit 110 includes the control unit 13.

The control unit 13 receives a clock signal generated from the oscillator circuit 16. Moreover, the control unit 13 generates the respective switching signals of the timings based on the input clock signal.

The control unit 13 generates a switching signal in accordance with the type of liquid crystal display unit connected and outputs the generated switching signal to the switching units 14 and 17 and the LCD driver power supply circuit 18.

In FIG. 1, since the TN liquid crystal 21 is connected, the control unit 13 generates a switching signal for selecting the input of the voltage step-down circuit 12 and outputs the generated switching signal to the switching units 14 and 17. Moreover, the control unit 13 generates a switching signal based on a voltage $V_{L1}$ and outputs the generated switching signal based on the voltage $V_{L1}$ to the LCD driver power supply circuit 18.

The switching signal may be set in advance in accordance with the type of liquid crystal connected, and may be set by forming a pattern on a substrate (not shown) in accordance with the switching signal during manufacturing. Alternatively, the switching signal may be set in advance in accordance with the type of liquid crystal connected and may be written in advance in a storage unit of the control unit 13 in accordance with the switching signal during manufacturing. Alternatively, when the control unit 13 is connected to the liquid crystal through a signal line (not shown), the control unit 13 may obtain the type of the liquid crystal through the signal line (not shown) and generate the switching signal based on the obtained signal.

The oscillator power supply circuit 15 which is a constant-voltage power supply circuit generates a voltage of 0.9 V using the voltage ranging from 1.5 V to 1.0 V output from the switching unit 14 and supplies the generated voltage of 0.9 V to the oscillator circuit 16. Thus, the oscillator power supply circuit 15 consumes power corresponding to a voltage difference $\Delta V$ ranging from 0.6 V (0.6=1.5−0.9) to 0.3 V (0.3=1.2−0.9) between the input and the output.

The oscillator circuit 16 generates a clock signal (for example, having a frequency of 32 kHz) used by the logic unit 110.

The LCD driver power supply circuit 18 receives the voltage ranging from 1.5 V to 1.2 V which is the output of the switching unit 17 and the switching signal based on the voltage $V_{L1}$=1.2 V output from the control unit 13. The LCD driver power supply circuit 18 generates the voltage $V_{L1}$=1.2 V from the input voltage ranging from 1.5 V to 1.2 V in accordance with the switching signal based on the input voltage $V_{L1}$=1.2 V. Moreover, the LCD driver power supply circuit 18 which is connected to capacitors C1 to C3 steps up the generated voltage $V_{L1}$=1.2 V using the capacitors C1 to C3 to generate a voltage $V_{L2}$=2.4 V which is 2 times the voltage $V_{L1}$, and a voltage $V_{L3}$=3.6 V which is 3 times the voltage $V_{L1}$. The LCD driver power supply circuit 18 supplies the generated voltages $V_{L1}$=1.2 V, $V_{L2}$=2.4 V, and $V_{L3}$=3.6 V to an LCD driver circuit 19.

The LCD driver circuit 19 drives the TN liquid crystal 21 using the supplied voltages $V_{L1}$=1.2 V, $V_{L2}$=2.4 V, and $V_{L3}$=3.6 V.

That is, when the TN liquid crystal 21 is a load, a voltage stepped down by the voltage step-down circuit 12 is supplied to the oscillator power supply circuit 15 and the LCD driver power supply circuit 18.

Figure 2:
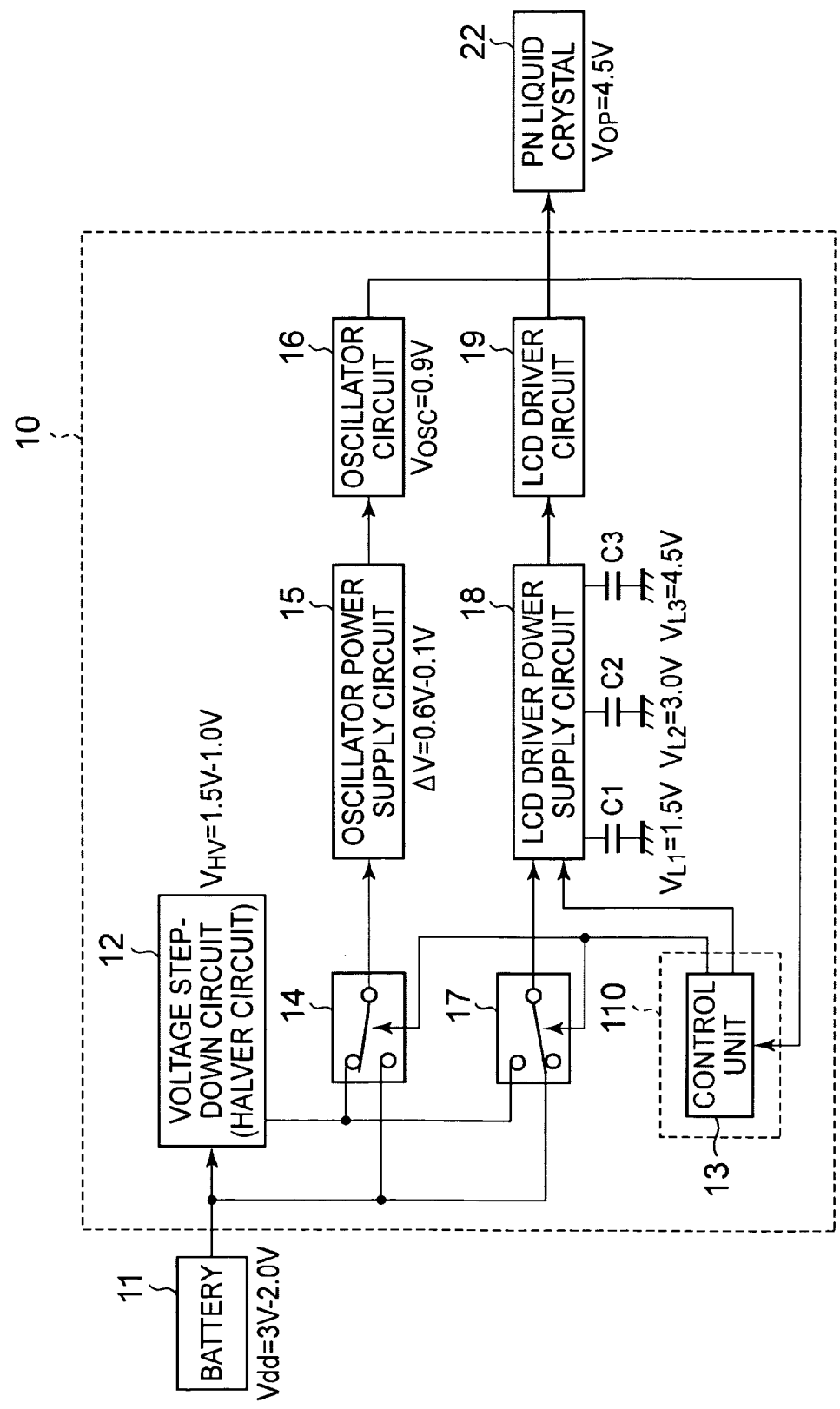
FIG. 2 is a block diagram of a power supply unit according to the first embodiment, to which a PN liquid crystal is connected.

FIG. 2 is a block diagram of a power supply unit 10 according to the present embodiment, to which a PN (Polymer Network) liquid crystal is connected. In FIG. 2, a PN liquid crystal 22 is a load.

Since the voltage step-down circuit 12 secures the voltage of 1.0 V or more used by the oscillator power supply circuit 15, for example, the output voltage of the battery 11 can be used in the range of from 3 V (initial state) to 2.0 V.

In FIG. 2, since the PN liquid crystal 22 is connected, the control unit 13 causes the switching unit 14 to select the input of the voltage step-down circuit 12 and the switching unit 17 to select the input of the battery 11 and generates and outputs the switching signal based on the voltage $V_{L1}$=1.5 V to the LCD driver power supply circuit 18.

The switching signal may be set in advance in accordance with the type of liquid crystal connected, and may be set by forming a pattern on a substrate (not shown) in accordance with the switching signal during manufacturing. Alternatively, the switching signal may be set in advance in accordance with the type of liquid crystal connected and may be written in advance in a storage unit of the control unit 13 in accordance with the switching signal during manufacturing. Alternatively, when the control unit 13 is connected to the liquid crystal through a signal line (not shown), the control unit 13 may obtain the type of the liquid crystal through the signal line (not shown) and generate the switching signal based on the obtained signal.

The LCD driver power supply circuit 18 receives the voltage ranging from 3.0 V to 2.0 V which is the output of the switching unit 17 and the switching signal based on the voltage $V_{L1}$=1.5 V output from the control unit 13. The LCD driver power supply circuit 18 generates the voltage $V_{L1}$=1.5 V from the input voltage ranging from 3.0 V to 2.0 V in accordance with the switching signal based on the input voltage $V_{L1}$=1.5 V. Moreover, the LCD driver power supply circuit 18 which is connected to capacitors C1 to C3 steps up the generated voltage $V_{L1}$=1.5 V to generate a voltage $V_{L2}$=3.0 V which is 2 times the voltage $V_{L1}$, and a voltage $V_{L3}$=4.5 V which is 3 times the voltage $V_{L1}$ using the capacitors C1 to C3. The LCD driver power supply circuit 18 supplies the generated voltages $V_{L1}$=1.5 V, $V_{L2}$=3.0 V, and $V_{L3}$=4.5 V to an LCD driver circuit 19.

The LCD driver circuit 19 drives the PN liquid crystal 22 using the supplied voltages $V_{L1}$=1.5 V, $V_{L2}$=3.0 V, and $V_{L3}$=4.5 V.

That is, when the PN liquid crystal 22 is a load, the voltage stepped down by the voltage step-down circuit 12 is supplied to the oscillator power supply circuit 15, and the output voltage of the battery 11 is directly supplied to the LCD driver power supply circuit 18.

As above, the power supply unit of the present embodiment includes the respective driver circuits corresponding to the loads. Moreover, the control unit 13 controls the voltages supplied to the respective driver circuits so as to be changed in accordance with the load, and also controls the 1-times voltage $V_{L1}$ generated by the LCD driver power supply circuit 18. As a result, since the optimal voltages are supplied to the respective power supply circuits in accordance with the liquid crystal display device connected, it is possible to decrease power consumption in the respective power supply circuits.

Moreover, in the present embodiment, an example in which the output voltage of the voltage step-down circuit 12 is supplied to the oscillator power supply circuit 15, and the output voltage of the battery 11 is supplied to the LCD driver power supply circuit 18 has been illustrated and described with reference to FIG. 2. However, depending on the liquid crystal display device connected and a liquid crystal display method, the output voltage of the battery 11 may be supplied to the oscillator power supply circuit 15, and the output voltage of the voltage step-down circuit 12 may be supplied to the LCD driver power supply circuit 18.

Furthermore, in the present embodiment, an example in which the voltage based on the voltage $V_{L1}$ and output to the LCD driver power supply circuit 18 is 1.2 V or 1.5 V has been described. However, the voltage $V_{L1}$ may be another voltage value depending on the type of liquid crystal display unit which is a load connected. Moreover, the output voltage of the battery 11 and the voltage generated by being stepped down by the voltage step-down circuit 12 may be another voltage value depending on the type or property of the liquid crystal display unit connected.

Furthermore, the power supply unit described in the present embodiment may be applied, for example, to an electronic timepiece, a pedometer, and the like. In this case, for example, the TN liquid crystal 21 of FIG. 1 or the PN liquid crystal 22 of FIG. 2 corresponds to the liquid crystal display unit of an electronic timepiece or a pedometer. Moreover, when the power supply unit of the present embodiment is applied to an electronic timepiece, the power supply unit may include a backlight (not shown) for illuminating the liquid crystal display unit, a buzzer (not shown), and the like. In this case, the power supply unit may further include a driver circuit (not shown) for driving the backlight and buzzer, and the voltages supplied to the respective driver circuits may be changed by the control unit 13.

Second Embodiment

Figure 3:
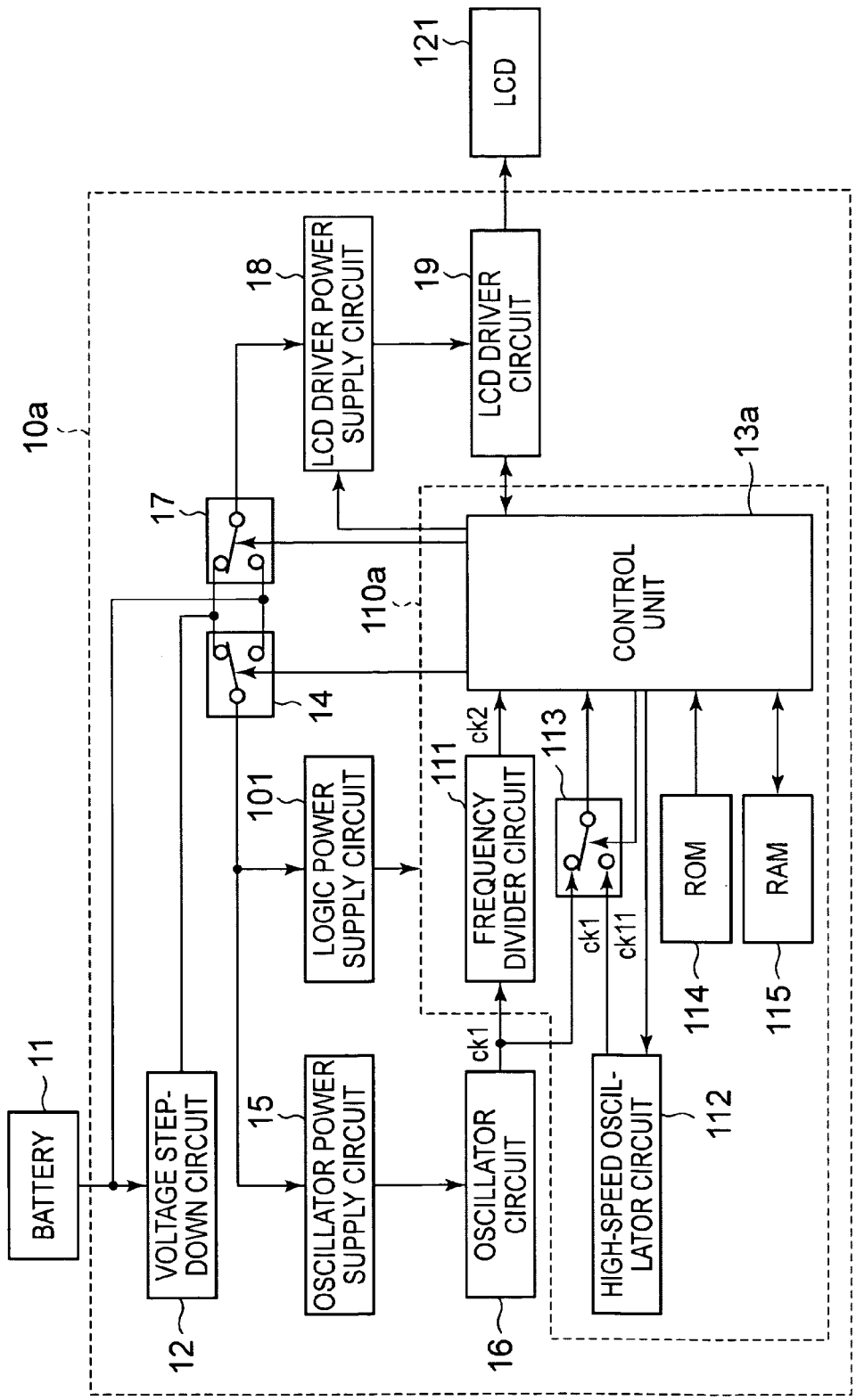
FIG. 3 is a diagram showing an example of internal circuits of a power supply unit according to a second embodiment.

FIG. 3 is a diagram showing an example of the internal circuits of a power supply unit 10a according to the present embodiment.

The power supply unit 10a includes a voltage step-down circuit 12, switching units 14 and 17, an oscillator power supply circuit (second power supply circuit) 15, an oscillator circuit 16, an LCD driver power supply circuit (first power supply circuit) 18, a LCD driver circuit 19, a logic power supply circuit 101, and a logic unit 110a. The logic unit 110a includes a control unit 13a, a frequency divider circuit 111, a high-speed oscillator circuit 112, a switching unit 113, a ROM (Read Only Memory) 114, and a RAM (Random Access Memory) 115. Moreover, the power supply unit 10a is connected to a battery 11 (power supply voltage) and a LCD (Liquid Crystal Display) 121. Functional units having the same functions as those shown in FIG. 1 or 2 of the first embodiment will be denoted by the same reference numerals, and redundant description thereof will not be provided.

The logic power supply circuit 101 which is a constant voltage power supply circuit has an input portion connected to the output of the switching unit 14 and an output portion connected to the logic unit 110a. The logic power supply circuit 101 receives the same voltage as the oscillator power supply circuit 15 from any one of the battery 11 and the voltage step-down circuit 12 through the switching unit 14. The logic power supply circuit 101 generates a voltage for the logic unit 110a using the supplied voltage and supplies the generated voltage to the logic unit 110a.

The frequency divider circuit 111 of the logic unit 110a receives a clock signal ck1 generated by the oscillator circuit 16. The frequency divider circuit 111 divides the input clock signal ck1 by a preset division factor and outputs the divided clock signal ck2 to the control unit 13a.

The control unit 13a receives the clock ck2 divided by the frequency divider circuit 111 and the clock signal (ck1 or ck11) output by the switching unit 113. The control unit 13a is connected to the ROM 114 and the RAM 115. The control unit 13a generates an instruction regarding a CPU clock frequency to be generated and an instruction regarding whether or not to perform high-speed oscillation based on the settings written in advance in the ROM 114 connected and outputs the generated instructions to the high-speed oscillator circuit 112. The control unit 13a generates the respective switching signals of the switching units 14, 17, and 113 based on the settings written in advance in the ROM 114 and outputs the generated respective switching signals to the switching units 14, 17, and 113. The control unit 13a reads LCD setting data stored in the ROM 114, generates a switching signal based on the $V_{L1}$ (1-times voltage) based on the read setting data, and outputs the generated switching signal to the LCD driver power supply circuit 18. For example, when the LCD connected is a TN liquid crystal, the control unit 13a outputs the switching signal based on $V_{L1}$=1.2 V to the LCD driver power supply circuit 18. Alternatively, when the LCD connected is a PN liquid crystal, the control unit 13a outputs the switching signal based on $V_{L1}$=1.5 V to the LCD driver power supply circuit 18. The control unit 13a generates a LCD driving signal for the LCD driver circuit 19 based on the clock signal ck2, the clock signal ck1 or ck11, the voltages ($V_{L1}$, $V_{L2}$, and $V_{L3}$) input from the LCD driver circuit 19, and the information read from the ROM 114. The control unit 13a outputs the generated LCD driving signal to the LCD driver circuit 19.

The high-speed oscillator circuit 112 receives the instruction regarding the CPU clock frequency and the instruction regarding whether or not to perform high-speed oscillation, generated by the control unit 13a. When an instruction to perform high-speed oscillation is input, the high-speed oscillator circuit 112 generates a high-speed clock signal ck11 (for example, having a frequency of 500 kHz) faster than the clock signal ck1 generated by the oscillator circuit 16 based on the input instruction regarding the CPU clock frequency and outputs the generated high-speed clock signal clock signal ck11 to the switching unit 113. When an instruction to perform high-speed oscillation is not input, the high-speed oscillator circuit 112 does not perform high-speed oscillation and does not generate the high-speed clock signal ck11.

The switching unit 113 receives the clock signal ck1 generated by the oscillator circuit 16, the clock signal ck11 generated by the high-speed oscillator circuit 112, and a clock switching signal from the control unit 13a. The switching unit 113 selects any one of the clock signals ck1 and ck11 based on the clock switching signal from the control unit 13a and outputs the selected clock signal to the control unit 13a.

The LCD driver power supply circuit 18 receives the output voltage of the battery 11 or the output voltage of the voltage step-down circuit 12 through the switching unit 17 and also receives the switching signal based on the voltage $V_{L1}$ and the LCD driving signal from the control unit 13a.

The LCD driver power supply circuit 18 generates a voltage $V_{L1}$ from the voltage input from the switching unit 17 based on the switching signal based on the voltage $V_{L1}$ input from the control unit 13a. The LCD driver power supply circuit 18 steps up the generated voltage $V_{L1}$ to generate voltages $V_{L2}$ and $V_{L3}$. For example, when the LCD connected is a TN liquid crystal, the LCD driver power supply circuit 18 generates a voltage $V_{L1}$=1.2 V and steps up the generated voltage $V_{L1}$=1.2 V to generate the voltages $V_{L2}$=2.4 V and $V_{L3}$=3.6 V. Alternatively, when the LCD connected is a PN liquid crystal, the LCD driver power supply circuit 18 generates a voltage $V_{L1}$=1.5 V and steps up the generated voltage $V_{L1}$=1.5 V to generate the voltages $V_{L2}$=3.0 V and $V_{L3}$=4.5 V.

FIG. 4 is a diagram illustrating an example of the settings and the power supplies of the respective circuit units, used depending on the liquid crystal display device 121 connected in the present embodiment. In this figure, the CPU clock frequency and the types of power supplies used by the oscillator power supply circuit, the logic power supply circuit, and the LCD driver power supply circuit are grouped and set for each type of LCD.

For example, when the liquid crystal display device is a TN liquid crystal or a STN liquid crystal, the control unit 13a outputs a switching signal to the switching unit 113 so as to select the clock signal ck1=32 kHz generated by the oscillator circuit 16. Moreover, the control unit 13a outputs a switching signal to the switching units 14 and 17 so as to select the input from the voltage step-down circuit 12.

As a result, the oscillator power supply circuit 15, the logic power supply circuit 101, and the LCD driver power supply circuit 18 receive the input from the voltage step-down circuit 12, namely the output from a halver circuit.

When the liquid crystal display device is a PN liquid crystal, the control unit 13a outputs a switching signal to the switching unit 113 so as to select the clock signal ck1=32 kHz generated by the oscillator circuit 16. Moreover, the control unit 13a outputs a switching signal to the switching unit 14 so as to select the input from the voltage step-down circuit 12. Furthermore, the control unit 13a outputs a switching signal to the switching unit 17 so as to select the input from the battery 11.

As a result, the oscillator power supply circuit 15 and the logic power supply circuit 101 receives the input from the voltage step-down circuit 12, namely the output from a halver circuit, and the LCD driver power supply circuit 18 receives the input from the battery 11.

When driving a TN liquid crystal, a STN liquid crystal, and a PN liquid crystal at a high speed, the control unit 13a outputs an instruction to perform high-speed oscillation and an instruction to generation a clock signal of 500 kHz to the high-speed oscillator circuit 112. Moreover, the control unit 13a outputs a switching signal to the switching unit 113 so as to select the clock signal ck11=500 kHz generated by the high-speed oscillator circuit 112. Furthermore, the control unit 13a outputs a switching signal to the switching units 14 and 17 so as to select the input from the battery 11.

As a result, the oscillator power supply circuit 15, the logic power supply circuit 101, and the LCD driver power supply circuit 18 receive the input from the battery 11.

Figure 5:
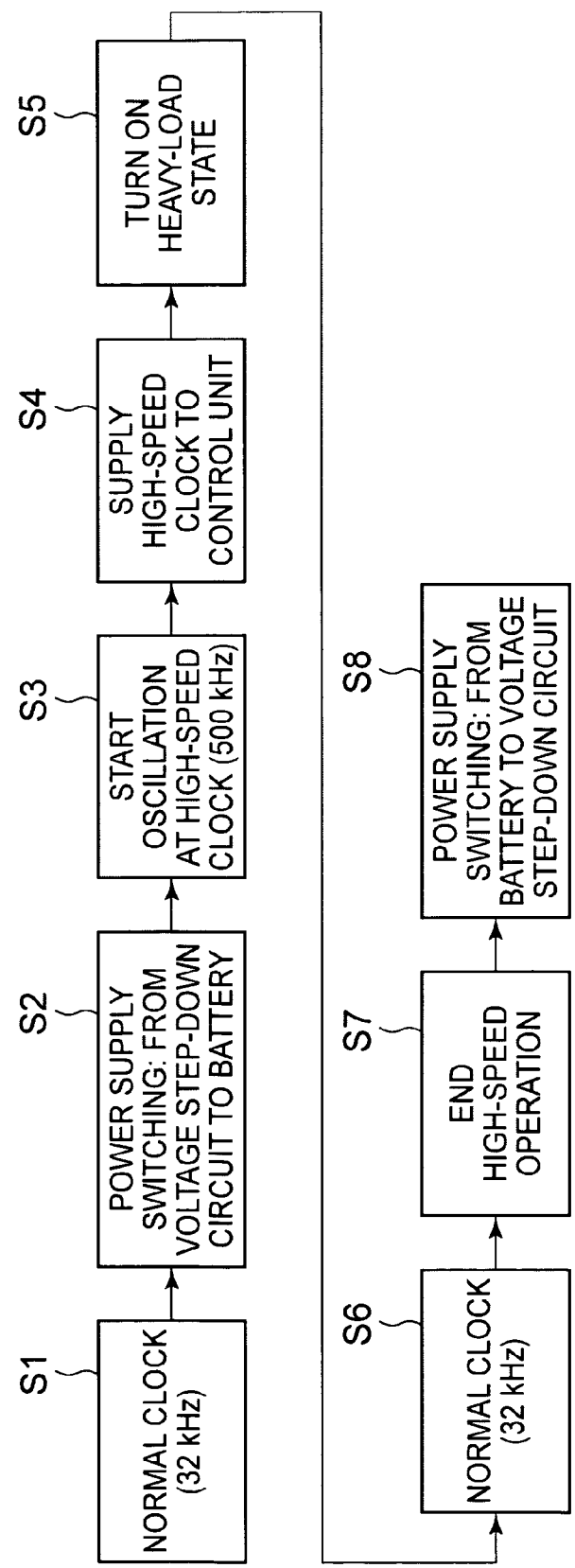
FIG. 5 is a diagram illustrating an example of a voltage switching procedure when switching clock signals according to the second embodiment.

Next, a voltage switching procedure when switching clock signals according to the present embodiment will be described with reference to FIG. 5. FIG. 5 is a diagram illustrating an example of a voltage switching procedure when switching clock signals according to the present embodiment.

First, the control unit 13a starts operating at 32 kHz which is a clock frequency during a normal operation (step S1). In this case, the logic unit 110a including the control unit 13a receives the output voltage of the voltage step-down circuit 12.

Subsequently, the control unit 13a outputs a signal to the switching unit 14 so as to switch from the output voltage of the voltage step-down circuit 12 to the output voltage of the battery 11 (step S2). As a result, the logic power supply circuit 101 receives the output voltage of the battery 11. Subsequently, the control unit 13a outputs an instruction to start high-speed oscillation to the high-speed oscillator circuit 112 (step S3). When a predetermined period of time has elapsed after the start of high-speed oscillation, and the oscillation waveform is stabilized, the control unit 13a outputs a switching signal to the switching unit 113 so as to select the clock signal ck11 for a high-speed oscillation operation. The high-speed oscillator circuit 112 inputs the high-speed oscillation clock signal ck11 to the control unit 13a. The control unit 13a starts a high-speed operation based on the input high-speed oscillation clock signal ck11 (step S4).

Subsequently, when a heavy-load operation, for example, an operation of turning on the backlight of the LCD 121 or an alarm operation is performed during the high-speed oscillation operation, the control unit 13a turns on a heavy load state (step S5).

Subsequently, when the heavy-load ON state ends, the control unit 13a outputs a switching signal to the switching unit 113 so as to select the clock signal ck1 for the normal operation. As a result, the control unit 13a returns to the operation based on the normal clock signal ck1=32 kHz (step S6).

Subsequently, the control unit 13a outputs an instruction to stop high-speed oscillation to the high-speed oscillator circuit 112 so as to end the high-speed operation (step S7). Subsequently, the control unit 13a outputs a signal to the switching unit 17 so as to switch from the output voltage of the battery 11 to the output voltage of the voltage step-down circuit 12 (step S8).

Through the procedure above, by switching the clock signal input to the control unit 13a and the voltage supplied to the control unit 13a, it is possible to prevent operation errors due to a change in the voltage of the control unit 13a during the heavy-load operation and the high-speed operation switching.

As above, the power supply unit of the present embodiment includes the respective driver circuits corresponding to the loads. Moreover, the control unit 13a controls the voltages supplied to the respective driver circuits so as to be changed in accordance with the load, and also controls the 1-times voltage $V_{L1}$ generated by the LCD driver power supply circuits 18. As a result, since the optimal voltages are supplied to the respective power supply circuits in accordance with the liquid crystal display device connected, it is possible to decrease power consumption in the respective power supply circuits.

Moreover, in the present embodiment, an example in which the same voltage is supplied to the oscillator power supply circuit 15 and the logic power supply circuit 101 has been described. However, depending on the purpose of use, a switching unit may be provided to each of the oscillator power supply circuit 15 and the logic power supply circuit 101 so that the voltage supplied is changed in accordance with the switching signal of the control unit 13a.

Figure 6:
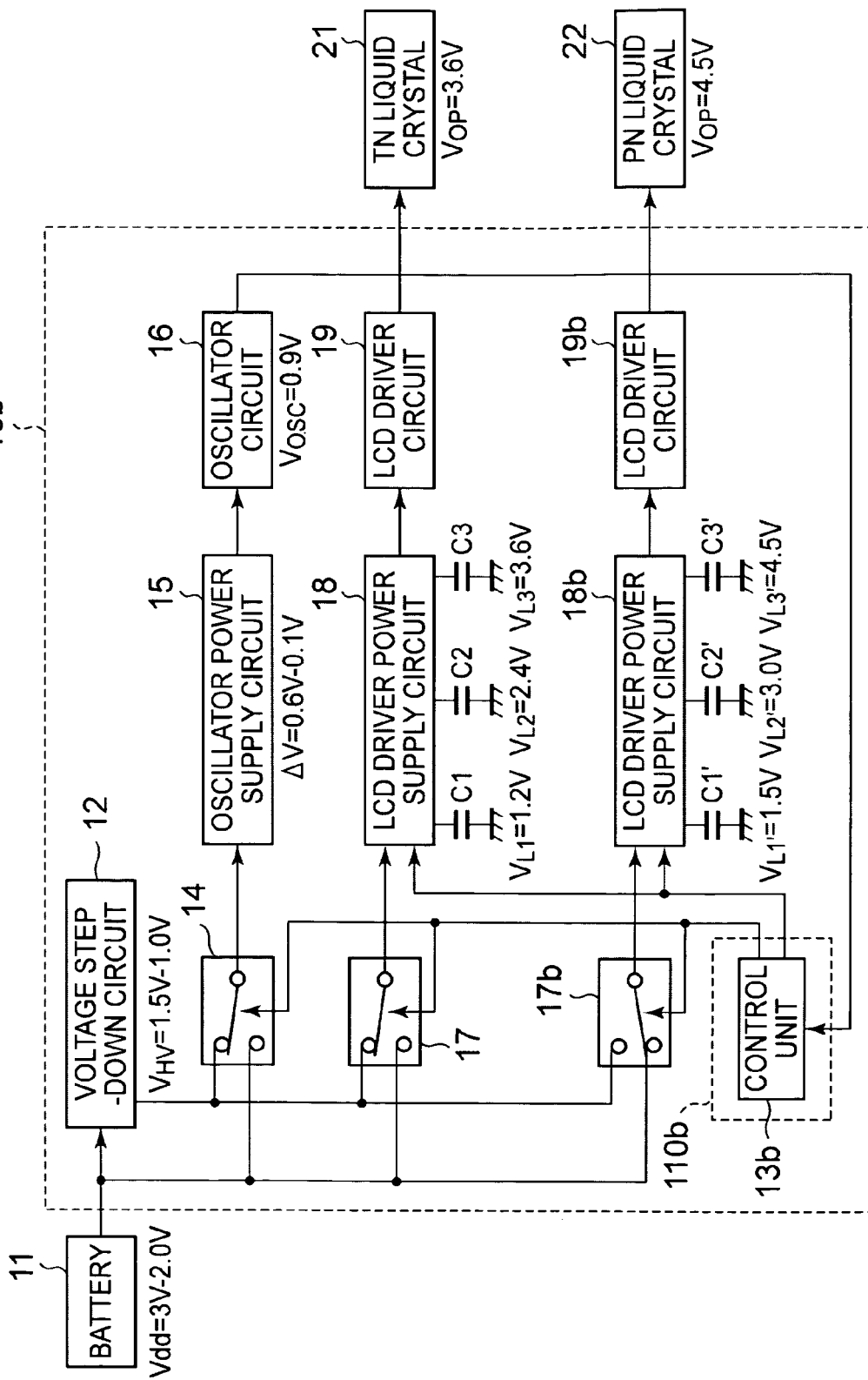
FIG. 6 is a block diagram of a power supply unit according to the second embodiment, to which a TN liquid crystal and a PN liquid crystal are connected.

Furthermore, in the present embodiment, an example in which one liquid crystal display unit is connected to the power supply unit 10a has been described. However, for example, the power supply unit 10a may include both the TN liquid crystal 21 and the PN liquid crystal 22. FIG. 6 is a block diagram of a power supply unit 10b according to the present embodiment, to which the TN liquid crystal 21 and the PN liquid crystal 22 are connected.

As shown in FIG. 6, the power supply unit 10b of the present embodiment includes a voltage step-down circuit 12, a control unit 13b, switching units 14, 17, and 17b, an oscillator power supply circuit 15, an oscillator circuit 16, a logic unit 110b, LCD driver power supply circuits 18 and 18b, and LCD driver circuits 19 and 19b. The logic unit 110b includes a control unit 13b.

The control unit 13b generates and outputs a switching signal for selecting the output voltage of the voltage step-down circuit 12 to the switching units 14 and 17 and generates and outputs a switching signal for selecting the output voltage of the battery 11 to the switching unit 17b. Moreover, the control unit 13b outputs a switching signal based on the voltage $V_{L1}$=1.2 V to the LCD driver power supply circuit 18 and outputs a switching signal based on the voltage $V_{L1}$=1.5 V to the LCD driver power supply circuit 18b.

The LCD driver power supply circuit 18 generates a voltage $V_{L1}$=1.2 V based on the switching signal based on the voltage $V_{L1}$=1.2 V input from the control unit 13b. The LCD driver power supply circuit 18 steps up the generated voltage $V_{L1}$=1.2 V to generate voltages $V_{L2}$=2.4 V and $V_{L3}$=3.6 V and outputs the generated respective voltages to the LCD driver circuit 19.

The LCD driver power supply circuit 18b generates a voltage $V_{L1}'=1.5$ V based on the switching signal based on the voltage $V_{L1}'=1.5$ V input from the control unit 13b. The LCD driver power supply circuit 18b steps up the generated voltage $V_{L1}'=1.5$ V to generate voltages $V_{L2}'=3.0$ V and $V_{L3}'=4.5$ V and outputs the generated respective voltages to the LCD driver circuit 19b.

The LCD driver circuit 19 drives a TN liquid crystal 21 connected thereto based on the input voltage. The LCD driver circuit 19b drives a PN liquid crystal 22 connected thereto based on the input voltage.

As above, even when a plurality of liquid crystal display units having different maximum driving voltages is connected to the power supply unit 10b, the power supply unit 10b includes the respective driver circuits corresponding to the loads and controls the voltages supplied to the respective driver circuits so as to be changed in accordance with the load, and also controls the 1-times voltage $V_{L1}$ generated by the LCD driver power supply circuits 18 and 18b. As a result, since the optimal voltages are supplied to the respective power supply circuits in accordance with the liquid crystal display device connected, it is possible to decrease power consumption in the respective power supply circuits.

Moreover, in the present embodiment, an example in which the LCD driver power supply circuits 18 and 18b generates three voltages of the voltage $V_{L1}$, the voltage $V_{L2}$ which is two times the voltage $V_{L1}$, and the voltage $V_{L3}$ which is three times the voltage $V_{L1}$ has been described. However, two or three or more voltages may be generated depending on the liquid crystal display unit connected and the display method.

Furthermore, in the present embodiment, an example in which the voltages supplied to the respective power supply circuits are changed in accordance with the type of the LCD 121 connected has been described. However, the output voltage of the battery 11 may be detected by a voltage detection circuit of the battery 11, and the voltages supplied to the respective power supply circuits may be changed based on the detected voltage. For example, when the output voltage of the battery 11 is lower than a predetermined voltage, the control unit 13a or 13b may switch the voltage supplied to the logic unit 110b from the output voltage of the voltage step-down circuit 12 to the output voltage of the battery 11.

Furthermore, in the present embodiment, an example in which the voltage based on the voltage $V_{L1}$ and output to the LCD driver power supply circuit 18 is 1.2 V or 1.5 V has been described. However, the voltage $V_{L1}$ may be another voltage value depending on the type of liquid crystal display unit which is a load connected. Moreover, the output voltage of the battery 11 and the voltage generated by being stepped down by the voltage step-down circuit 12 may be another voltage value depending on the type or property of the liquid crystal display unit connected.

Furthermore, the power supply unit described in the present embodiment may be applied, for example, to an electronic timepiece, a pedometer, and the like. In this case, for example, the LCD 121 of FIG. 3 corresponds to the liquid crystal display unit of an electronic timepiece or a pedometer. Moreover, when the power supply unit of the present embodiment is applied to an electronic timepiece, the power supply unit may include a backlight (not shown) for illuminating the liquid crystal display unit, a buzzer (not shown), and the like. In this case, the power supply unit may further include a driver circuit (not shown) for driving the backlight and buzzer. In this case, the power supply unit may further include a driver circuit (not shown) for driving the backlight and buzzer, and the voltages supplied to the respective driver circuits may be changed by the control unit 13a or 13b.

Third Embodiment

In the first and second embodiments, an example in which the voltages supplied to the respective power supply circuits, the clock signal used by the control unit 13, and the 1-times voltage $V_{L1}$ generated by the LCD driver power supply circuit 18 are changed depending on the LCD connected has been described. In the third embodiment, the voltages supplied to the respective power supply circuits, the clock signal input to the control unit, and the like are changed in accordance with the operation of a sensor connected to a power supply unit. That is, since a heavy load state is created when a sensor operates, for example, a high-speed operation is stopped, and the voltage supplied to a sensor 211 is switched to the output voltage of the battery 11.

Figure 7:
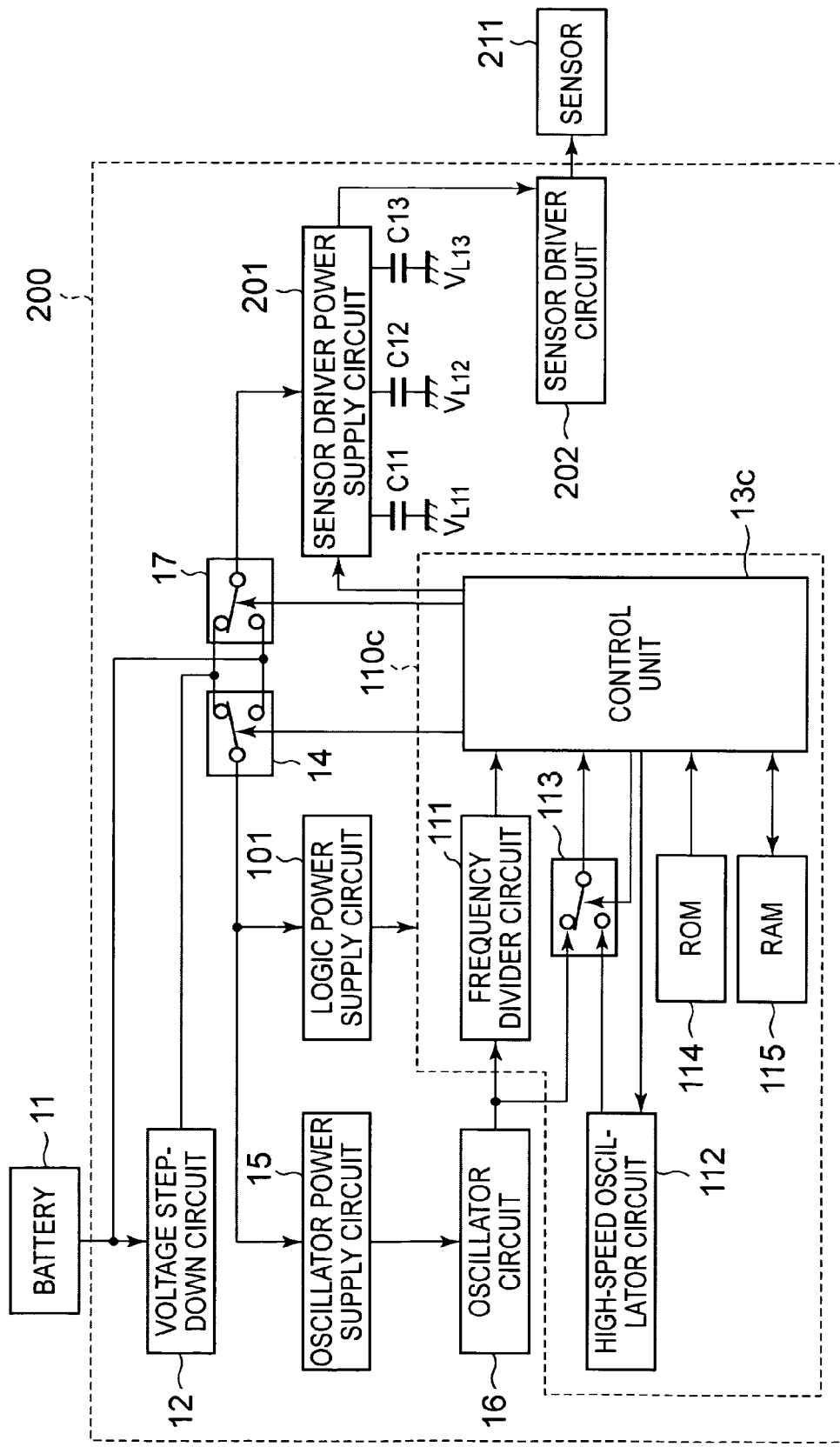
FIG. 7 is a diagram showing an example of internal circuits of a power supply unit according to a third embodiment, in which a sensor is connected to a load.

FIG. 7 is a diagram showing an example of the internal circuits of a power supply unit 200 according to the present embodiment, to which a sensor 211 is connected to a load. The same functional units as those shown in FIG. 3 of the second embodiment will be denoted by the same reference numerals, and redundant description thereof will not be provided.

The power supply unit 200 includes a voltage step-down circuit 12, switching units 14 and 17, an oscillator power supply circuit 15, an oscillator circuit 16, a sensor driver power supply circuit 201, a sensor driver circuit 202, a logic power supply circuit 101, and a logic unit 110c. The logic unit 110c includes a control unit 13c, a frequency divider circuit 111, a high-speed oscillator circuit 112, a switching unit 113, a ROM 114, and a RAM 115. Moreover, the power supply unit 200 is connected to a battery 11 and a sensor 211.

The sensor driver power supply circuit 201 receives a voltage selected by the switching unit 17 and a switching signal based on a voltage $V_{L11}$ supplied from the control unit 13c. The sensor driver power supply circuit 18 generates a voltage $V_{L11}$ from the voltage input from the switching unit 17 based on a switching signal based on the voltage $V_{L11}$ input from the control unit 13c. The sensor driver power supply circuit 201 which is connected to capacitors C11 to C13 steps up the generated voltage $V_{L11}$ using the capacitors C11 to C13 to generate a voltage $V_{L12}$ which is two times the voltage $V_{L11}$ and a voltage $V_{L13}$ which is three times the voltage $V_{L11}$. The LCD driver power supply circuit 18 supplies the generated voltages $V_{L11}$, $V_{L12}$, and $V_{L13}$ to the sensor driver circuit 202.

The sensor driver circuit 202 drives the sensor 211 using the supplied voltages $V_{L11}$, $V_{L12}$, and $V_{L13}$.

The sensor 211 is an attitude detection sensor such as, for example, a 2-axis sensor or a 3-axis sensor. Alternatively, the sensor 211 may be a 3-axis acceleration sensor or the like.

The control unit 13c outputs a signal for switching the output voltage to the switching units 14, 17, and 113 and a switching signal based on the 1-times voltage $V_{L1}$ generated by the sensor driver power supply circuit 201 in accordance with the sensor connected.

As an example, the control unit 13c generates an instruction regarding an oscillation frequency to be generated by the high-speed oscillator circuit 112 and an instruction regarding whether or not to perform high-speed oscillation based on the settings or the like written in advance in the ROM 114 connected thereto and outputs the generated instructions to the high-speed oscillator circuit 112. The control unit 13c generates the respective switching signals of the switching units 14, 17, and 113 based on the setting written in advance in the ROM 114 connected thereto and outputs the generated respective switching signals to the switching units 14, 17, and 113. The control unit 13c reads LCD setting data stored in the ROM 114 and outputs a switching signal based on the voltage $V_{L1}$ to the sensor driver power supply circuit 201 based on the read setting data.

Subsequently, when operating the sensor, the control unit 13c outputs a switching signal to the switching unit 17 so as to select the output voltage of the battery 11. As a result, in the heavy load state, the output voltage of the battery 11 is supplied to the sensor driver circuit that drives the sensor 211.

As above, the power supply unit of the present embodiment includes the respective driver circuits corresponding to the operation of the loads. Moreover, the control unit 13c controls the voltages supplied to the respective driver circuits so as to be changed in accordance with the load, and also controls the 1-times voltage $V_{L1}$ generated by the sensor driver power supply circuit. As a result, since the optimal voltages are supplied to the respective power supply circuits in accordance with the sensor connected, it is possible to decrease power consumption in the respective power supply circuits.

Moreover, in the present embodiment, an example in which the same voltage is supplied to the oscillator power supply circuit 15 and the logic power supply circuit 101 has been described. However, depending on the purpose of use, a switching unit may be provided to each of the oscillator power supply circuit 15 and the logic power supply circuit 101 so that the voltage supplied is changed in accordance with the switching signal of the control unit 13c.

Furthermore, in the present embodiment, although an example in which one sensor is connected has been described, for example, the power supply unit may include sensors of which the maximum use voltages are different. In this case, for example, such a configuration can be realized with the configuration shown in FIG. 5 by replacing the LCD driver power supply circuits 18 and 18b with the sensor driver power supply circuit, and the LCD driver circuits 19 and 19b with the sensor driver circuit, and the connected TN liquid crystal 21 and PN liquid crystal 22 with the sensor.

Moreover, the liquid crystal display unit and the sensor may be connected. In this case, for example, such a configuration can be realized with the configuration shown in FIG. 5 by replacing the LCD driver power supply circuit 18b with the sensor driver power supply circuit, the LCD driver circuit 19b with the sensor driver circuit, and the connected PN liquid crystal 22 with the sensor.

Furthermore, the power supply unit 200 described in the present embodiment may be applied, for example, to an electronic timepiece, a pedometer, and the like. In this case, a LCD driver circuit (not shown) may be further provided to the configuration shown in FIG. 7, and the voltages supplied to the respective driver circuits may be controlled by the control unit 13c.

Fourth Embodiment

Figure 8:
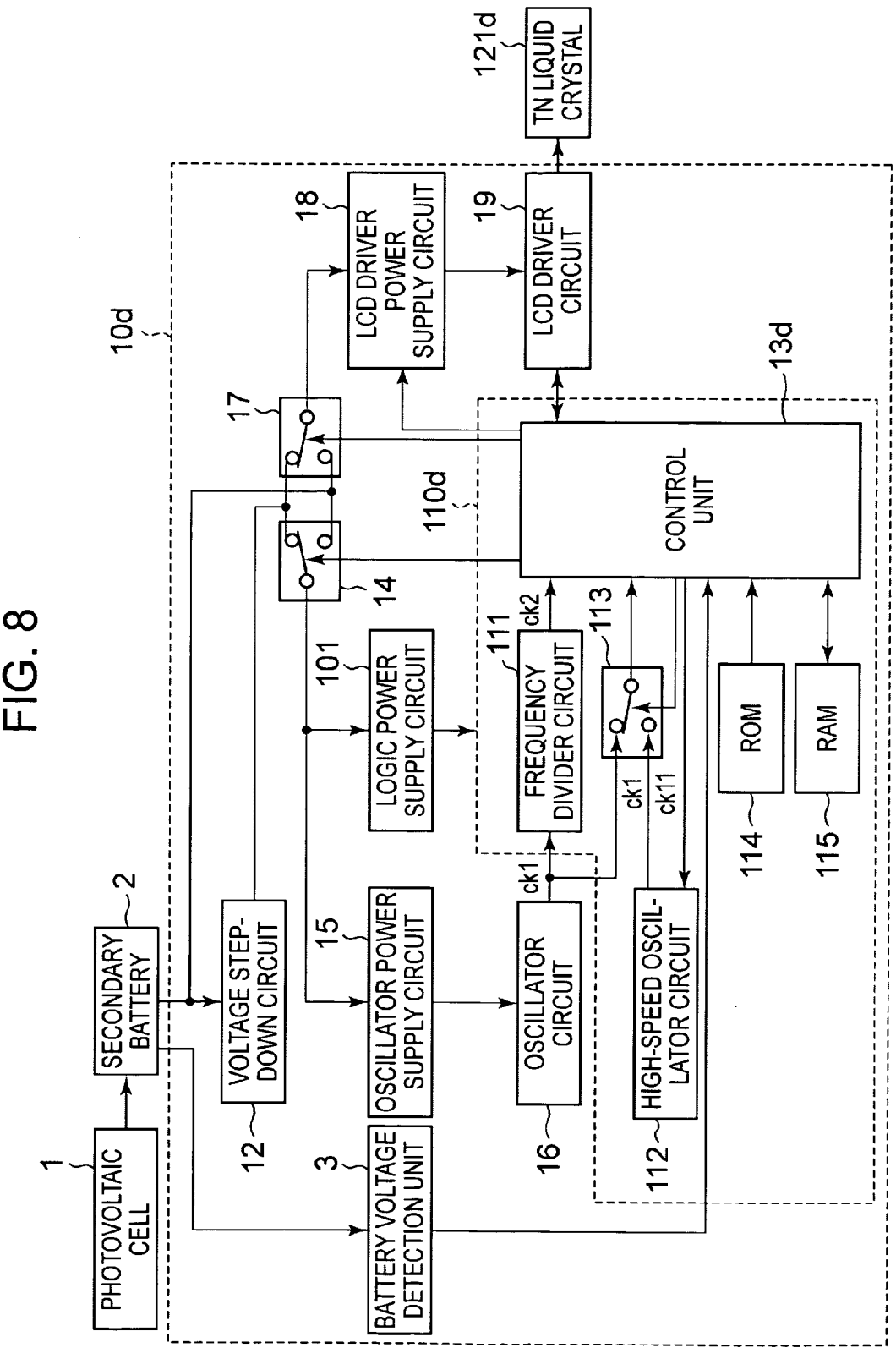
FIG. 8 is a block diagram of a power supply unit according to a fourth embodiment, to which a TN liquid crystal is connected.

FIG. 8 is a block diagram of a power supply unit 10d according to the fourth embodiment, to which a TN liquid crystal is connected. The power supply unit 10d includes a battery voltage detection unit 3, a voltage step-down circuit 12, switching units 14 and 17, an oscillator power supply circuit (second power supply circuit) 15, an oscillator circuit 16, an LCD driver power supply circuit (first power supply circuit) 18, an LCD driver circuit 19, a logic power supply circuit 101, and a logic unit 110d. Here, the power supply unit 10d (FIG. 8) according to the present embodiment is different from the power supply unit 10a (FIG. 3) according to the second embodiment, in that the logic unit 110a is changed to the logic unit 110d, and the battery voltage detection unit 3 is added.

The logic unit 110d includes a control unit 13d, a frequency divider circuit 111, a high-speed oscillator circuit 112, a switching unit 113, a ROM (Read Only Memory) 114, and a RAM (Random Access Memory) 115. Here, the logic unit 110d (FIG. 8) according to the present embodiment is different from the logic unit 110d (FIG. 3) according to the second embodiment in that the control unit 13a is changed to the control unit 13d. Functional units having the same functions as those shown in FIG. 3 of the second embodiment will be denoted by the same reference numerals, and redundant description thereof will not be provided.

Moreover, in FIG. 8, the battery 11 in FIG. 3 is changed to a secondary battery 2, and the power supply unit 10d is connected to the secondary battery 2. The secondary battery 2 is connected to a photovoltaic cell 1. Moreover, in FIG. 8, the LCD 121 used as a load in FIG. 3 is changed to a TN liquid crystal 121d.

The photovoltaic cell 1 is an electricity generating device that converts light energy into electrical energy to thereby generate electricity. Thus, the photovoltaic cell 1 generates an amount of electricity corresponding to the amount of illuminated light. The photovoltaic cell 1 supplies the generated electricity to the secondary battery 2 to thereby charge the secondary battery 2.

The secondary battery 2 is charged by the electricity of the photovoltaic cell 1, supplied from the photovoltaic cell 1. The secondary battery 2 supplies the charged power supply voltage to the voltage step-down circuit 12, the switching unit 14, and the switching unit 17. Moreover, the secondary battery 2 supplies the respective units of the power supply unit 10d with electricity for operating the respective units through a power supply line (not shown).

The battery voltage detection unit 3 detects the voltage of the secondary battery 2 and outputs battery voltage information representing the detected battery voltage to a control unit 13d (described later) of the logic unit 110d.

The control unit 13d has the same function as the control unit 13a according to the second embodiment, except for the following aspects.

The control unit 13d outputs a switching signal to the switching units 14 and 17 based on the battery voltage represented by the battery voltage information input from the battery voltage detection unit 3. In this way, the control unit 13d switches the voltages supplied to the respective power supply circuits (the oscillator power supply circuit 15, the LCD driver power supply circuit 18, and the logic power supply circuit 101) between the output voltage of the secondary battery 2 and the output voltage of the voltage step-down circuit 12 based on the battery voltage.

FIG. 9 is a diagram showing the power supplies of the respective power supply circuits and the settings, used depending on the battery voltage of the secondary battery 2 in the fourth embodiment. In this figure, the types of power supplies used by the oscillator power supply circuit 15, the logic power supply circuit 101, and the LCD driver power supply circuit 18, information on whether the oscillator circuit is operated, information on whether the logic circuit is operated, and the type of display of the TN liquid crystal 121d are grouped and set for each range of the battery voltage of the secondary battery 2.

In FIG. 9, for example, when the battery voltage of the secondary battery 2 is in the range of 2.4 V to 3.0 V, all the power supplies used by the oscillator power supply circuit 15, the logic power supply circuit 101, and the LCD driver power supply circuit 18 are the output of the voltage step-down circuit (halver circuit) 12, both the oscillator circuit 16 and the logic unit 110*d* are operated, and the TN liquid crystal displays the clock.

Hereinafter, the process of the control unit 13*d* according to the present embodiment will be described with reference to the example of FIG. 9.

When the battery voltage of the secondary battery 2 decreases gradually so that the battery voltage is lower than a voltage (for example, 2.4 V) in which a desired LCD step-down voltage (3.6 V for the TN liquid crystal 121*d*) is obtained using a step-down voltage supplied from the voltage step-down circuit 12, the control unit 13*d* outputs a switching signal to the switching unit 17 so as to select the input from the secondary battery 2.

In this way, the control unit 13*d* can switch the voltage supplied to the LCD driver power supply circuit 18 from the output voltage of the voltage step-down circuit 12 to the output voltage of the secondary battery 2. As a result, the power supply unit 10*d* can decrease the lower limit of the output voltage of the secondary battery 2 necessary for operation to 2.0 V and thus can display the clock for a longer period than the power supply unit of the related art. In the power supply unit of the related art, the lower limit of the output voltage of the secondary battery 2 necessary for displaying the clock is 2.4 V.

In addition, in the present embodiment, the control unit 13*d* performs the control of connecting the switching unit 17 to the secondary battery 2 when the power supply voltage is lower than the lower limit of a voltage necessary for driving the TN liquid crystal 121*d* using the step-down voltage supplied from the voltage step-down circuit 12. However, the invention is not limited to this, but the control may be performed when the power supply voltage is lower than a voltage lower or higher than the lower limit by a predetermined voltage.

That is, the control unit 13*d* may connect the switching unit (first switching unit) 17 to the secondary battery (power supply) 2 when the voltage (power supply voltage) of the secondary battery 2 is lower than a voltage determined based on a voltage necessary for driving the TN liquid crystal (load unit) 121*d* using the step-down voltage supplied from the voltage step-down circuit 12.

Moreover, when the battery voltage is lower than the lower-limit voltage (for example, 2.0 V) in which the oscillator circuit 16 and the logic unit 110*d* are driven by the voltage step-down circuit 12, the control unit 13*d* outputs a switching signal to the switching unit 14 so as to select the input from the secondary battery 2. Here, the output voltage of the battery voltage is two times the output voltage of the voltage step-down circuit 2, a case where the lower-limit driving voltage is lower than 2.0 V is equivalent to a case where the output voltage of the voltage step-down circuit 12 is lower than 1.0 V.

In this way, the control unit 13*d* can switch the voltage supplied to the oscillator power supply circuit 15 and the logic power supply circuit 101 from the output voltage of the voltage step-down circuit 12 to the output voltage of the secondary battery 2.

Moreover, in this case, the control unit 13*d* controls the LCD driver circuit 19 so that the display of the TN liquid crystal 121*d* is changed from the clock display to a charge warning display.

In addition, in the present embodiment, the control unit 13*d* performs the control of connecting the switching unit 14 to the secondary battery 2 when the voltage (power supply voltage) of the secondary battery 2 is lower than the lower-limit voltage in which circuits (the oscillator circuit 16 and the logic unit 110*d*) other than the LCD driver circuit 19 are driven by the step-down voltage supplied from the voltage step-down circuit 12. However, the invention is not limited to this, but the control may be performed when the power supply voltage is lower than a voltage lower or higher by a predetermined voltage than the lower-limit voltage in which circuits other than the LCD driver circuit 19 are driven by the step-down voltage supplied from the voltage step-down circuit 12.

That is, the control unit 13*d* may connect the switching unit (second switching unit) 14 to the secondary battery (power supply) 2 when the voltage (power supply voltage) of the secondary battery 2 is lower than a voltage determined based on a voltage necessary for driving circuits other than the LCD driver circuit (load driving unit) 19 using the step-down voltage supplied from the voltage step-down circuit 12.

In addition, although the power supply unit 10*d* according to the present embodiment is connected to the secondary battery 2, the invention is not limited to this, but the power supply unit 10*d* may be connected to a primary battery. When the power supply unit 10*d* is connected to a primary battery, and the battery voltage is lower than a voltage (for example, 2.0 V) serving as the lower-limit operation voltage of the oscillator circuit 16 and the logic unit 110*d*, the control unit 13*d* switches the display of the TN liquid crystal 121*d* to a battery exchange warning display rather than the charge warning display.

In addition, in the present embodiment, when the battery voltage is in the range of 1.7 V to 2.0 V, the control unit 13*d* switches the display of the TN liquid crystal 121*d* from the clock display to the charge warning display. However, the invention is not limited to this, but the clock display may remain.

In this way, in the power supply unit 10*d* of the present embodiment, since the lower limit of the output voltage of the secondary battery 2 necessary for operation can be decreased to 1.7 V, it is possible to display the clock for a longer period than the power supply unit of the related art. In the power supply unit of the related art, the lower limit of the output voltage of the secondary battery 2 necessary for operation is 2.4 V.

Moreover, when the battery voltage is lower than a voltage (for example, 1.7 V) lower or higher by a predetermined voltage than the lower-limit voltage (for example, 1.2 V) in which the LCD step-up voltage (3.6 V for the TN liquid crystal 121*d*) is obtained using the voltage supplied from the secondary battery 2, the control unit 13*d* stops driving (put into a non-driven state) the LCD driver circuit 19 so as to turn off the display of the TN liquid crystal 121*d*.

Moreover, when the battery voltage is not more than the lower-limit voltage (for example, 1.0 V) in which the oscillator circuit 16 and the logic unit 110*d* are driven by the power supply voltage supplied from the secondary battery 2, the control unit 13*d* stops the oscillator circuit 16 and the logic unit 110*d*.

On the other hand, the control unit 13*d* performs the same power source switching operation even when the battery voltage increases from a voltage (for example, 0 V) of equal to or smaller than a lower-limit voltage (for example, 1.0 V) in which the oscillator circuit 16 and the logic unit 110*d* are driven by the power supply voltage supplied from the secondary battery 2. Specifically, the control unit 13*d* restarts the oscillator circuit 16 and the logic unit 110*d* when the battery voltage is higher than a voltage (for example, 1.0 V) serving as the lower-limit operation voltage of the oscillator circuit 16 and the logic unit 110*d*.

Moreover, when the battery voltage is not less than a voltage (for example, 1.7 V) lower or higher than by a predetermined voltage than the lower-limit voltage (for example, 1.2

V) in which the LCD step-up voltage (3.6 V for the TN liquid crystal 121*d*) is obtained by the power supply voltage supplied from the secondary battery 2, the control unit 13*d* restarts driving the LCD driver circuit 19 and controls the LCD driver circuit 19 so that the display of the TN liquid crystal 121*d* is changed to a charge warning display.

That is, the control unit 13*d* drives the TN liquid crystal (load) 121*d* when the detected power supply voltage is not less than a voltage determined based on a voltage necessary for driving the TN liquid crystal (load) 121*d* using the power supply voltage supplied from the secondary battery (power supply) 2.

In this way, although the power supply unit of the related art cannot restart the display of the TN liquid crystal 121*d* unless the output voltage of the secondary battery 2 restores up to 2.4 V, the control unit 13*d* of the present embodiment can restart the display of the TN liquid crystal 121*d* when the output voltage of the secondary battery 2 restores up to 1.7 V. As a result, the control unit 13*d* can shorten the time consumed from the start of charging to the restart of displaying.

Moreover, when the battery voltage is not less than the lower-limit voltage (for example, 2.0 V) in which the oscillator circuit 16 and the logic unit 110*d* are driven by the step-down voltage supplied from the voltage step-down circuit 12, the control unit 13*d* outputs a switching signal to the switching unit 14 so as to select the input from the voltage step-down circuit 12. In this way, the control unit 13*d* can switch the voltage supplied to the oscillator power supply circuit 15 and the logic power supply circuit 101 from the output voltage of the secondary battery 2 to the output voltage of the voltage step-down circuit 12.

Moreover, in this case, the control unit 13*d* controls the LCD driver circuit 19 so that the display of the TN liquid crystal 121*d* is switched from the charge warning display to the clock display.

Moreover, when the battery voltage is not less than the lower-limit voltage (for example, 2.4 V) in which a desired LCD step-up voltage (in the example of FIG. 8, 3.6 V since the TN liquid crystal 121*d* is connected) is obtained using the step-down voltage supplied from the voltage step-down circuit 12, the control unit 13*d* outputs a switching signal to the switching unit 17 so as to select the input from the voltage step-down circuit 12.

As above, the power supply unit 10*d* of the present embodiment includes the battery voltage detection unit 3 that detects the battery voltage (power supply voltage) of the secondary battery 2 and switches the voltages supplied to the respective power supply circuits between the output voltage of the voltage step-down circuit 12 and the output voltage of the secondary battery 2 in accordance with the detected battery voltage (power supply voltage) of the secondary battery 2. That is, the control unit 13*d* performs the switching of the voltages supplied to the respective power supply circuits based on the detected battery voltage (power supply voltage) of the secondary battery 2.

Specifically, in the power supply unit 10*d*, when the battery voltage is lower than a battery voltage (for example, 2.4 V) in which the LCD step-up voltage is obtained using the output voltage of the voltage step-down circuit 12, the control unit 13*d* controls the voltage supplied to the LCD driver power supply circuit 18 so as to be switched from the output voltage of the voltage step-down circuit 12 to the output voltage of the secondary battery 2.

In this way, since the power supply unit 10*d* of the present embodiment can decrease the lower limit of the output voltage of the secondary battery 2 necessary for displaying the clock more so than the power supply unit of the related art, it is possible to display the clock for a longer period than the power supply unit of the related art.

Moreover, in the power supply unit 10*d* of the present embodiment, the control unit 13*d* performs control so that the display of the liquid crystal is restarted when as a result of charging, the battery voltage of the secondary battery 2 is not less than a voltage (for example, 1.7 V) lower or higher by a predetermined voltage than the lower-limit voltage (for example, 1.2 V) in which the LCD step-up voltage (3.6 V for the TN liquid crystal 121*d*) is obtained by the power supply voltage supplied from the secondary battery 2. That is, the control unit 13*d* drives the TN liquid crystal 121*d* which is a load when the detected voltage is not less than a predetermined voltage.

In this way, the power supply unit 10*d* of the present embodiment can decrease the voltage necessary for restarting the display of the liquid crystal more so than the power supply unit of the related art and thus can shorten the time consumed from the start of charging to the restart of the charge warning display more so than the power supply unit of the related art.

In the present embodiment, although the case of the TN liquid crystal 121*d* has been described by way of an example of the load, the invention is not limited to this, the load may be an LCD and may be a PN liquid crystal.

Fifth Embodiment

Figure 10:
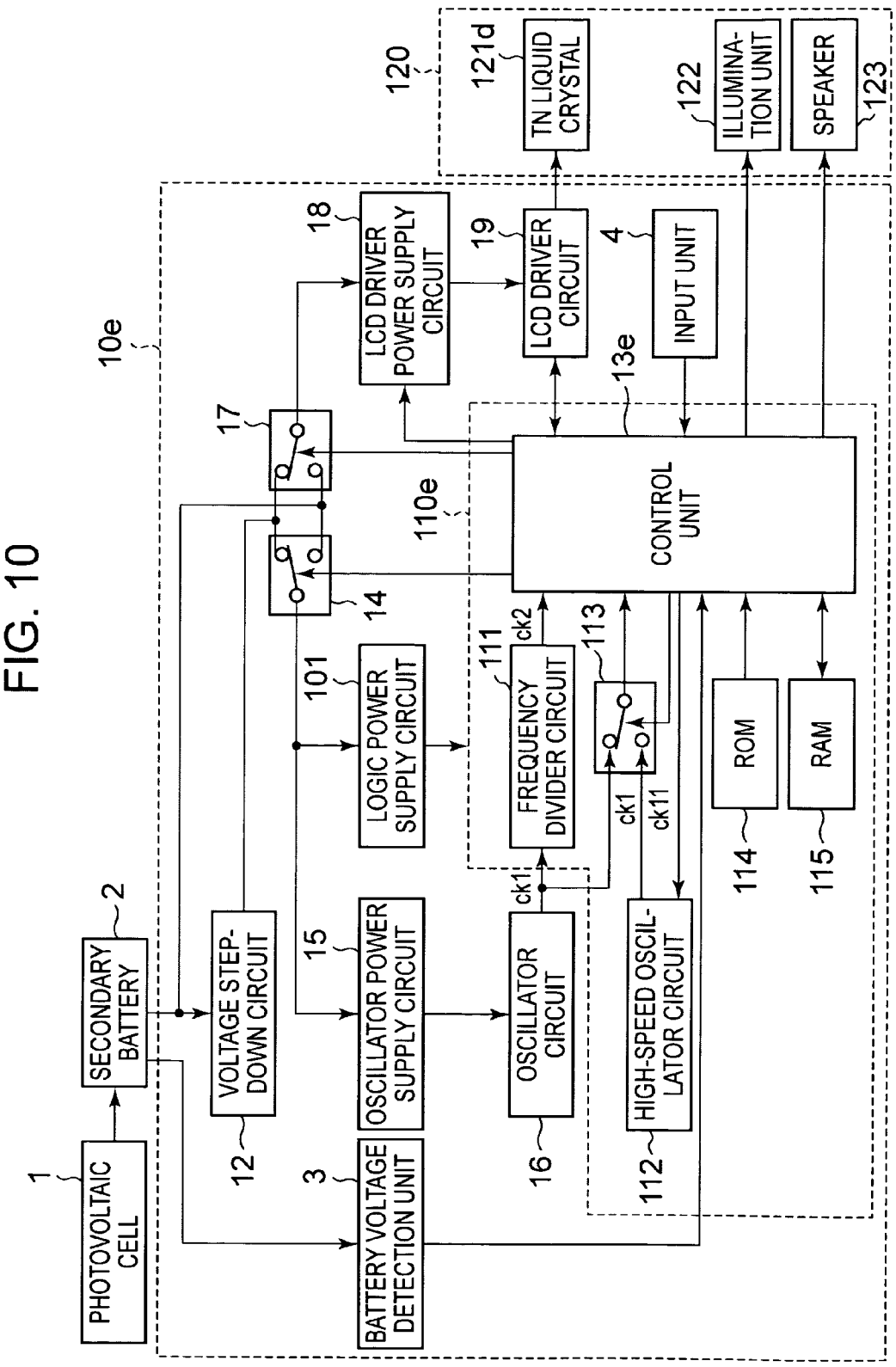
FIG. 10 is a block diagram of a power supply unit according to a fifth embodiment, to which a TN liquid crystal is connected.
Figure 12:
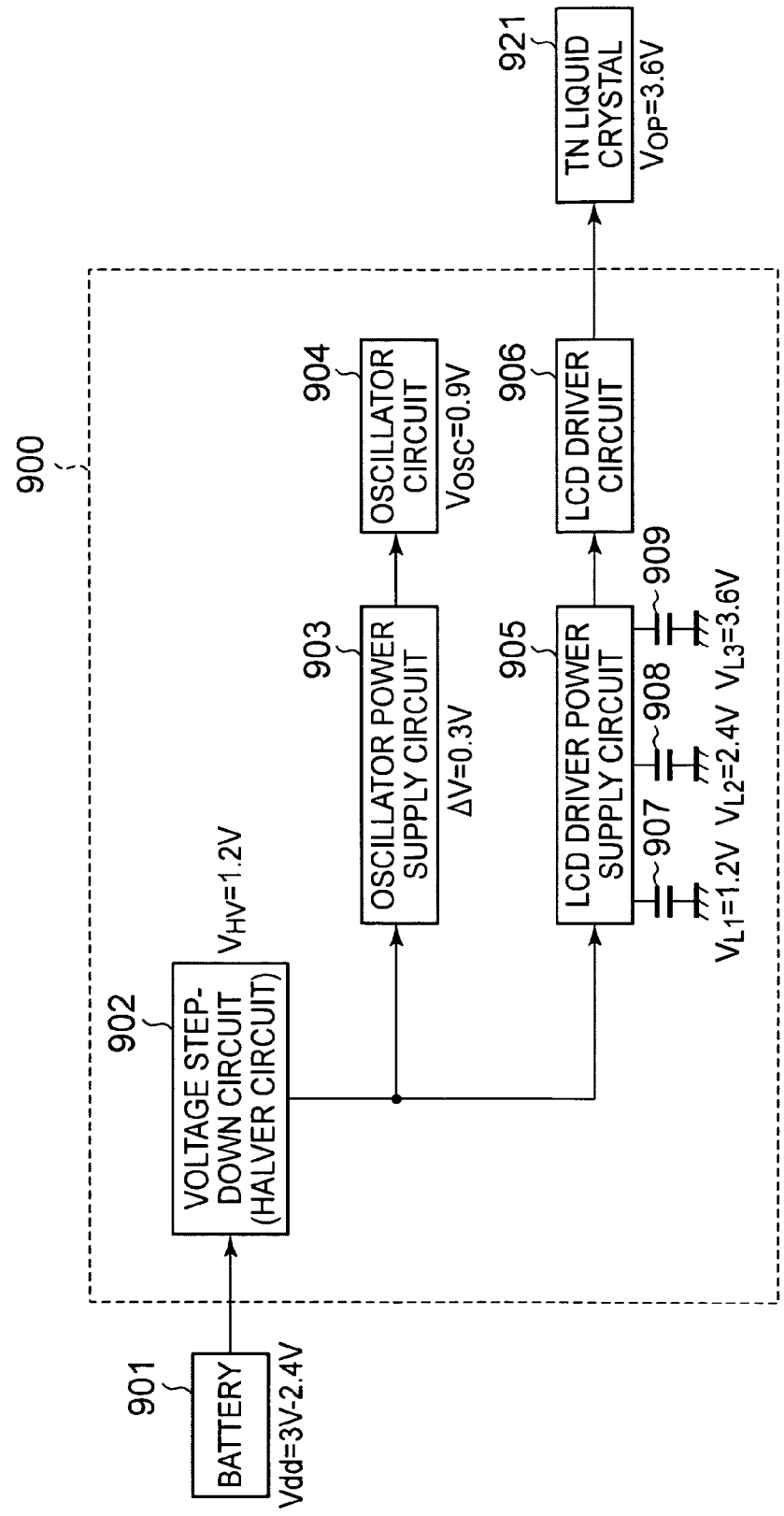
FIG. 12 is a block diagram of a power supply unit of an electronic device having a TN liquid crystal according to the related art.
Figure 13:
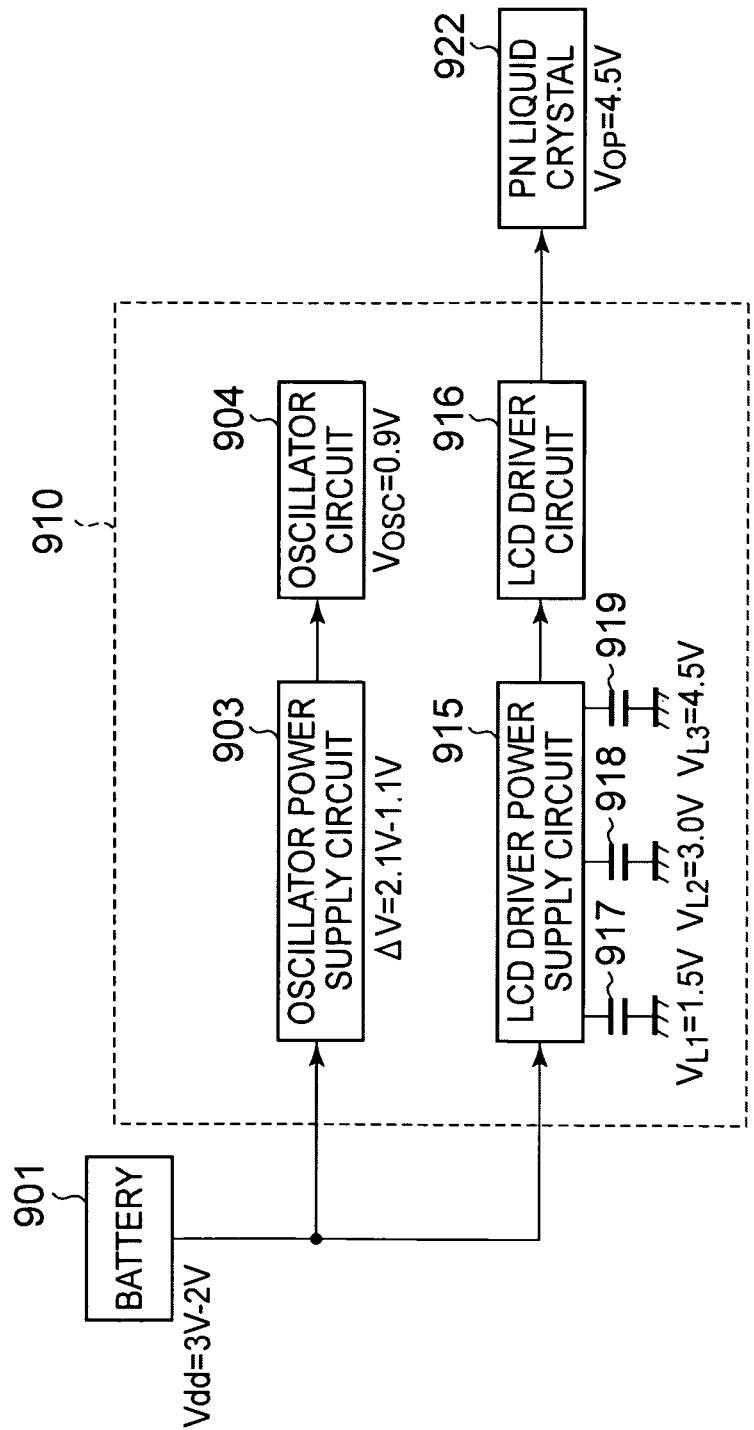
FIG. 13 is a block diagram of a power supply unit of an electronic device having a PN liquid crystal according to the related art.

FIG. 10 is a block diagram of a power supply unit 10*e* according to the fifth embodiment, to which a TN liquid crystal is connected. The power supply unit 10*e* includes a battery voltage detection unit 3, an input unit 4, a voltage step-down circuit 12, switching units 14 and 17, an oscillator power supply circuit (second power supply circuit) 15, an oscillator circuit 16, an LCD driver power supply circuit (first power supply circuit) 18, an LCD driver circuit 19, a logic power supply circuit (first power supply circuit) 101, and a logic unit 110*e*. Here, the power supply unit 10*e* (FIG. 10) according to the present embodiment is different from the power supply unit 10*d* (FIG. 8) according to the fourth embodiment, in that the logic unit 110*d* is changed to the logic unit 110*e*, and the input unit 4 is added.

Moreover, the logic unit 110*e* (FIG. 10) according to the present embodiment is different from the logic unit 110*d* (FIG. 8) according to the second embodiment, in that the control unit 13*d* is changed to the control unit 13*e*. Functional units having the same functions as those shown in FIG. 8 of the fourth embodiment will be denoted by the same reference numerals, and redundant description thereof will not be provided.

A load unit 120 at the outer side of the power supply unit 10*e* includes a TN liquid crystal 121*d*, an illumination unit 122, and a speaker (warning sound unit) 123. In FIG. 10, the control unit 13*e* of the power supply unit 10*d* in FIG. 8 is further connected to the illumination unit 122 and the speaker 123.

The input unit 4 includes a backlight starting switch and an alarm setting switch. When the user of this device presses the backlight starting switch, the input unit 4 outputs backlight ON information to the control unit 13*e* indicating that the backlight starting switch is pressed.

When the user operates the alarm setting switch, the input unit 4 outputs alarm time information to the control unit 13*e* indicating the set alarm time.

The control unit 13*e* has the same function as the control unit 13*d* according to the fourth embodiment, except for the following aspects.

When the backlight ON information is input from the input unit 4, the control unit 13e supplies a current with a predetermined value (for example, 10 mA) to the illumination unit 122 for a predetermined period (for example, 3 seconds). In this way, the illumination unit 122 performs illumination for the predetermined period (for example, 3 seconds) using the current supplied from the control unit 13e.

The control unit 13e stores the alarm time information input from the input unit 4 in the RAM 115. When the time indicated by the alarm time information stored in the RAM 115 is reached, the control unit 13e supplies current with a predetermined value (for example, 1 mA) to the speaker 123 for a predetermined period (for example, 20 seconds) in synchronization with a clock signal ck2 of a predetermined frequency (for example, 2 kHz) input from the frequency divider circuit 111. In this way, the speaker 123 outputs a buzzing sound for a predetermined period (for example, 20 seconds) with the current supplied from the control unit 13e.

During the heavy-load driving state such as when performing illumination and generating buzzing sound, the battery voltage of the secondary battery 2 temporarily decreases up to a threshold voltage (for example, 2.4 V) or less in which a desired LCD step-up voltage (3.6 V for the TN liquid crystal 121d) is obtained using the step-down voltage supplied from the voltage step-down circuit 12 and restores to the threshold voltage (for example, 2.4 V) or more after the heavy-load driving state ends.

The control unit 13e outputs a switching signal to the switching units 14 and 17 based on the information input from the input unit 4. In this way, the control unit 13e switches the voltages supplied to the respective power supply circuits (the oscillator power supply circuit 15, the LCD driver power supply circuit 18, and the logic power supply circuit 101) between the output voltage of the secondary battery 2 and the output voltage of the voltage step-down circuit 12 based on the input information.

FIG. 11 is a diagram showing an example of the power supplies of the respective power supply circuits and the setting, used depending on the battery voltage of the secondary battery 2 in the fifth embodiment. In this figure, the battery voltage of the secondary battery 2 and the types of power supplies used by the oscillator power supply circuit 15, the logic power supply circuit 101, and the LCD driver power supply circuit 18 are grouped and set for each heavy-load operation state.

In FIG. 11, for example, before the driving of a heavy-load operation starts, the battery voltage of the secondary battery 2 is in the range of 2.4 V to 3.0 V, and all the power supplies used by the oscillator power supply circuit 15, the logic power supply circuit 101, and the LCD driver power supply circuit 18 are the output of the voltage step-down circuit (halver circuit) 12.

Hereinafter, the process of the control unit 13e according to the present embodiment will be described with reference to the example of FIG. 11. Before the driving of the heavy-load operation starts, the control unit 13e outputs a switching signal to the switching unit 17 so as to select the input from the voltage step-down circuit 12.

When the backlight ON information is input from the input unit 4 or the time indicated by the alarm time information stored in advance in the RAM 115 is reached, namely before the heavy-load operation is performed, the control unit 13e outputs a switching signal to the switching units 14 and 17 so as to select the input from the secondary battery 2.

That is, before the load unit 120 starts a predetermined heavy-load operation, the control unit 13e connects the switching units 14 and 17 to the secondary battery 2.

In this way, the control unit 13e can switch the voltages supplied to the respective power supply circuits from the output voltage of the voltage step-down circuit 12 to the output voltage of the secondary battery 2 before the heavy-load operation starts. As a result, the control unit 13e can supply a larger current than the current consumed when performing a general liquid crystal display operation to the illumination unit 122 or the speaker 123. Thus, it is possible to perform illumination or generate a warning sound with a larger current.

Moreover, when the backlight ON information is input from the input unit 4, the control unit 13e connects the switching units 14 and 17 to the secondary battery 2 and causes the illumination unit 122 to perform illumination for a predetermined period (for example, 3 seconds).

Moreover, when the time indicated by the alarm time information stored in advance in the RAM 115 is reached, the control unit 13e connects the switching units 14 and 17 to the secondary battery 2 and causes the speaker 123 to generate a buzzing sound for a predetermined period (for example, 20 seconds).

When the heavy-load operation such as illumination for a predetermined period (for example, 3 seconds) or generation of a buzzing sound for a predetermined period (for example, 20 seconds) ends, the control unit 13e obtains battery voltage information representing the battery voltage of the secondary battery 2 detected by the battery voltage detection unit 3 every predetermined period (for example, 1 minute).

When the battery voltage indicated by the battery voltage information obtained from the battery voltage detection unit 3 is not less than a threshold voltage (for example, 2.4 V) in which a desired LCD step-up voltage (3.6 V for the TN liquid crystal 121d) is obtained using the step-down voltage supplied from the voltage step-down circuit 12, the control unit 13e outputs a switching signal to the switching units 14 and 17 so as to select the input from the voltage step-down circuit 12.

That is, after the load unit performs a predetermined heavy-load operation, when the detected power supply voltage is not less than a voltage determined based on a voltage necessary for driving the TN liquid crystal (load) 121d by the voltage step-down circuit 12, the control unit 13e connects the switching unit (first switching unit) 17 and the switching unit (second switching unit) 14 to the voltage step-down circuit 12.

In this way, when the detected power supply voltage is not less than a threshold voltage in which a desired LCD step-up voltage is obtained using the step-down voltage supplied from the voltage step-down circuit 12, the control unit 13e can switch the voltages supplied to the respective power supply circuits from the output voltage of the secondary battery 2 to the output voltage of the voltage step-down circuit 12. As a result, the control unit 13e can decrease the power consumption in the power supply unit 10e by supplying the voltage stepped down by the voltage step-down circuit 12 to the respective power supply circuits.

As above, in the power supply unit 10e of the present embodiment, when the backlight ON information is input from the input unit 4 or a predetermined time is reached, the control unit 13e controls the voltages supplied to the respective power supply circuits so as to be switched from the output voltage of the voltage step-down circuit 12 to the output voltage of the secondary battery 2.

In this way, during the period of the heavy-load operation such as the operation of performing illumination or generating a buzzing sound, the power supply unit 10e of the present embodiment can supply a larger current than the current necessary when performing a general liquid crystal display operation to the illumination unit 122 or the speaker 123. Thus, it is possible to perform illumination or generate a buzzing sound with a larger current than the power supply unit of the related art.

Moreover, in the power supply unit 10e of the present embodiment, after the heavy-load operation is performed, when the detected power supply voltage is not less than a threshold voltage (for example, 2.4 V) in which a desired LCD step-up voltage (3.6 V for the TN liquid crystal 121d) is obtained using the step-down voltage supplied from the voltage step-down circuit 12, the control unit 13e controls the voltages supplied to the respective power supply circuits so as to be switched from the output voltage of the secondary battery 2 to the output voltage of the voltage step-down circuit 12.

In this way, the power supply unit 10e can minimize the time necessary for supplying electricity directly from the secondary battery 2 to the respective power supply circuits. Thus, it is possible to realize a reduction in the power consumption of the power supply unit 10e while realizing the heavy-load operation such as the operation of performing illumination or generating a buzzing sound.

In the present embodiment, although the case of the TN liquid crystal 121d has been described by way of an example of the load, the invention is not limited to this, the load may be an LCD and may be a PN liquid crystal.

Moreover, in the power supply unit 10e according to the present embodiment, the control unit 13e switches the power supply immediately before the heavy-load operation is performed. However, the invention is not limited to this, but it is only necessary to switch the power supply before the heavy-load operation is performed and for example, the switching may occur at the time earlier by a predetermined period than the time when the heavy-load operation starts.

Moreover, in the present embodiment, although the control unit 13e connects the power supplies of all circuits to the secondary battery 2 when the heavy-load operation such as the operation of performing illumination or generating a buzzing sound, the invention is not limited to this. Even when the heavy-load operation is performed, if the battery voltage is not less than the lower-limit voltage (for example, 2.0 V) in which the oscillator circuit 16 and the logic unit 110d are driven by the step-down voltage supplied from the voltage step-down circuit 12, the control unit 13e may connect only the LCD driver power supply circuit 18 to the secondary battery 2.

That is, the control unit 13e may connect only the LCD driver power supply circuit (first power supply circuit) 18 that supplies a voltage to the LCD driver circuit 19 that drives the TN liquid crystal 121d serving as a load to the secondary battery 2 immediately before the heavy-load operation starts. In this case, the control unit 13e may maintain a state where the oscillator power supply circuit 15 and the logic power supply circuit 101 that supply a voltage to the circuits other than the LCD driver circuit 19 are connected to the voltage step-down circuit 12.

In other words, the control unit 13e connects at least the switching unit (first switching unit) 17 to the secondary battery (power supply) 2 immediately before the load unit 120 starts a predetermined heavy-load operation.

In this way, since the control unit 13e connects the switching unit 17 to a power supply immediately before a predetermined heavy-load operation starts, the TN liquid crystal 121d can display the clock even during the heavy-load operation. Moreover, after a load such as the illumination unit 122 or the speaker 123 performs a predetermined heavy-load operation, when the detected battery voltage of the secondary battery 2 is not less than a threshold voltage (for example, 2.4 V) in which a desired LCD step-up voltage (3.6 V for the TN liquid crystal 121d) is obtained using the step-down voltage supplied from the voltage step-down circuit 12, the control unit 13e connects the switching unit 17 to the voltage step-down circuit 12. Thus, it is possible to reduce the power consumption of the LCD driver power supply circuit 18 when the battery voltage of the secondary battery 2 is restored.

A program for realizing the functions of the respective units of the embodiments shown in FIGS. 1 to 3, 6 to 8, and 10 may be recorded on a computer-readable recording medium, and a computer system may read and execute the program recorded on the recording medium, whereby the processes of the respective units are performed. Here, it is assumed that the "computer system" includes an OS and hardware such as a peripheral device.

Moreover, it is assumed that when the "computer system" uses the WWW system, it also includes a home page providing environment (or display environment).

Moreover, the "computer-readable recording medium" means a transportable medium such as a flexible disk, a magneto-optical disk, a ROM (Read Only Memory), or a CD-ROM, a USB memory connected through a USB (Universal Serial Bus) I/F (interface), and a storage device such as a hard disk built into a computer system. Furthermore, it is assumed that the "computer-readable recording medium" includes a recording medium that dynamically stores programs for a fixed period such as a communication line when the programs are transmitted through a network such as the Internet or a communication circuit such as a telephone line and includes a recording medium that stores programs for a fixed period such as a volatile memory provided in a computer system serving as a server or a client in the above-mentioned case. In addition, the program may be a program for realizing a part of the functions described above and may be a program for realizing the functions described above in combination with a program already recorded in a computer system.

What is claimed is:

1. A power supply unit comprising:
    a first power supply circuit that supplies a voltage to a load driving unit that drives a load unit;
    a second power supply circuit that supplies a voltage to circuits other than the load driving unit;
    a first switching unit that connects any one of a power supply that supplies a power supply voltage and a voltage step-down circuit that supplies a step-down voltage of the power supply voltage to the first power supply circuit;
    a second switching unit that connects any one of the power supply that supplies the power supply voltage and the voltage step-down circuit that supplies the step-down voltage of the power supply voltage to the second power supply circuit, the second switching unit being disposed in parallel to the first switching unit; and
    a control unit that controls the connection by the first switching unit and the connection by the second switching unit to switch the voltage supplied to the first power supply circuit and the voltage supplied to the second power supply circuit in accordance with properties of the load driving unit.

2. The power supply unit according to claim 1, further comprising:
    a battery voltage detection unit that detects the power supply voltage,
    wherein the control unit performs switching based on the detected power supply voltage.

3. The power supply unit according to claim 2, wherein when the detected power supply voltage is lower than a voltage determined based on a voltage necessary for driving the load unit using the step-down voltage supplied from the voltage step-down circuit, the control unit connects the first switching unit to the power supply.

4. The power supply unit according to claim 2, wherein when the detected power supply voltage is lower than a voltage determined based on a voltage necessary for driving circuits other than the load driving unit using the step-down voltage supplied from the voltage step-down circuit, the control unit connects the second switching unit to the power supply.

5. The power supply unit according to claim 3, wherein when the detected power supply voltage is lower than a voltage determined based on a voltage necessary for driving circuits other than the load driving unit using the step-down voltage supplied from the voltage step-down circuit, the control unit connects the second switching unit to the power supply.

6. The power supply unit according to claim 2, wherein when the detected power supply voltage is not less than a voltage determined based on a voltage necessary for driving the load unit using the power supply voltage supplied from the power supply, the control unit drives the load unit.

7. The power supply unit according to claim 3, wherein when the detected power supply voltage is not less than a voltage determined based on a voltage necessary for driving the load unit using the power supply voltage supplied from the power supply, the control unit drives the load unit.

8. The power supply unit according to claim 4, wherein when the detected power supply voltage is not less than a voltage determined based on a voltage necessary for driving the load unit using the power supply voltage supplied from the power supply, the control unit drives the load unit.

9. The power supply unit according to claim 5, wherein when the detected power supply voltage is not less than a voltage determined based on a voltage necessary for driving the load unit using the power supply voltage supplied from the power supply, the control unit drives the load unit.

10. The power supply unit according to claim 2, wherein the control unit connects the first switching unit to the power supply immediately before the load unit starts a predetermined heavy-load operation.

11. The power supply unit according to claim 3, wherein the control unit connects the first switching unit to the power supply immediately before the load unit starts a predetermined heavy-load operation.

12. The power supply unit according to claim 4, wherein the control unit connects the first switching unit to the power supply immediately before the load unit starts a predetermined heavy-load operation.

13. The power supply unit according to claim 5, wherein the control unit connects the first switching unit to the power supply immediately before the load unit starts a predetermined heavy-load operation.

14. The power supply unit according to claim 2, wherein after the load unit performs a predetermined heavy-load operation, when the power supply voltage is not less than a voltage determined based on a voltage necessary for driving the load unit using the step-down voltage supplied from the voltage step-down circuit, the control unit connects the first switching unit to the voltage step-down circuit.

15. The power supply unit according to claim 1, further comprising:
a plurality of internal clocks,
wherein the control unit switches the plurality of internal clocks after switching the voltage supplied to the first power supply circuit in accordance with the properties or operation of the load driving unit.

16. The power supply unit according to claim 15, wherein when a clock faster than the slowest clock of the plurality of internal clocks is used, the control unit does not switch the voltage supplied to the first power supply circuit and the voltage supplied to the second power supply circuit in accordance with the properties or operation of the load driving unit to which the power supply circuit supplies a voltage.

17. The power supply unit according to claim 1,
wherein the load unit is a sensor,
wherein the first power supply circuit is a sensor driving power supply circuit that supplies a voltage to a sensor driving unit that drives the sensor, and
wherein the second power supply circuit is a logic power supply circuit that supplies a voltage to a logic unit that includes the control unit.

18. An electronic timepiece comprising the power supply unit according to claim 1.

19. A power supply unit comprising:
a first power supply circuit that supplies a voltage to a load driving unit that drives a load unit;
a second power supply circuit that supplies a voltage to circuits other than the load driving unit; and
a control unit that switches a voltage supplied to the first power supply circuit and a voltage supplied to the second power supply circuit in accordance with properties of the load driving unit;
wherein the load unit is a liquid crystal display device;
wherein the first power supply circuit is an LCD driving power supply circuit that supplies a voltage to an LCD driving unit that drives the liquid crystal display device; and
wherein the second power supply circuit is a logic power supply circuit that supplies a voltage to a logic unit that includes the control unit.

* * * * *